United States Patent
Das et al.

(10) Patent No.: US 9,001,758 B2
(45) Date of Patent: Apr. 7, 2015

(54) FLEXIBLE BANDWIDTH SMALL CELLS

(75) Inventors: Soumya Das, San Diego, CA (US);
Edwin C. Park, San Diego, CA (US);
Olufunmilola O. Awoniyi, San Diego, CA (US); Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 13/549,989

(22) Filed: Jul. 16, 2012

(65) Prior Publication Data

US 2013/0182655 A1 Jul. 18, 2013

Related U.S. Application Data

(63) Continuation-in-part of application No. 13/466,348, filed on May 8, 2012, now Pat. No. 8,891,467.

(60) Provisional application No. 61/568,742, filed on Dec. 9, 2011, provisional application No. 61/556,777, filed on Nov. 7, 2011.

(51) Int. Cl.
*H04W 4/00* (2009.01)
*H04W 72/04* (2009.01)
(Continued)

(52) U.S. Cl.
CPC .......... *H04W 72/0453* (2013.01); *H04W 24/10* (2013.01); *H04W 72/082* (2013.01); *H04W 52/44* (2013.01); *H04W 72/04* (2013.01); *H04W 72/1273* (2013.01); *H04W 72/1268* (2013.01); *H04L 1/00* (2013.01); *H04W 16/14* (2013.01); *H04W 72/1215* (2013.01);
(Continued)

(58) Field of Classification Search
CPC ...... H04W 72/04; H04W 88/08; H04W 76/00
USPC .......................... 370/252, 310, 328, 329, 331
See application file for complete search history.

(56) References Cited

U.S. PATENT DOCUMENTS 7,206,350 B2 4/2007 Korobkov et al.
7,778,307 B2 8/2010 Kuchibhotla et al.
(Continued)

OTHER PUBLICATIONS

Co-pending U.S. Appl. No. 13/707,111, filed Dec. 6, 2012.
(Continued)

*Primary Examiner* — Un C Cho
*Assistant Examiner* — Siming Liu
(74) *Attorney, Agent, or Firm* — Jeffrey Jacobs

(57) ABSTRACT

Methods, systems, and devices for utilizing flexible bandwidth carriers for small cells are provided. Bandwidth scaling factor(s) for a small cell may be determined. A flexible bandwidth carrier may be generated for the small cell utilizing the bandwidth scaling factor. Some embodiments provide assistance with active hand-in due to more available PN offsets in the flexible bandwidth domain. Some embodiments enhance small cell discovery with high bandwidth scaling factor beacon-like small cells with little more power than that corresponding to the same power spectral density for normal bandwidth small cell. Some embodiments reduce the interference caused by small cell to macrocell users using an adaptive bandwidth scaling factor for small cells based on number of users supported and their traffic demand, to control the extent of overlap the macrocell has with small cell and the interference to macrocell mobiles. Some embodiments utilize self-configuration for small cells utilizing flexible bandwidth channels.

40 Claims, 26 Drawing Sheets

(51) Int. Cl.
  *H04W 24/10* (2009.01)
  *H04W 72/08* (2009.01)
  *H04W 52/44* (2009.01)
  *H04W 72/12* (2009.01)
  *H04L 1/00* (2006.01)
  *H04W 16/14* (2009.01)
  *H04W 52/14* (2009.01)
  *H04W 52/24* (2009.01)
  *H04W 52/40* (2009.01)
  *H04W 88/06* (2009.01)
  *H04W 88/10* (2009.01)
  *H04W 84/04* (2009.01)

(52) U.S. Cl.
  CPC .......... *H04W 52/146* (2013.01); *H04W 52/247* (2013.01); *H04W 52/40* (2013.01); *Y02B 60/50* (2013.01); *H04W 88/06* (2013.01); *H04W 88/10* (2013.01); *H04W 72/1289* (2013.01); *H04W 84/045* (2013.01)

(56) References Cited

U.S. PATENT DOCUMENTS

| | | | |
|---|---|---|---|
| 8,041,363 | B2 | 10/2011 | Burchfiel |
| 8,311,554 | B2 | 11/2012 | Abedi |
| 8,660,169 | B1 | 2/2014 | Karabinis |
| 2002/0036997 | A1 | 3/2002 | Kim et al. |
| 2002/0061031 | A1 | 5/2002 | Sugar et al. |
| 2004/0224719 | A1 | 11/2004 | Nounin et al. |
| 2005/0094558 | A1 | 5/2005 | Lu |
| 2007/0242600 | A1 | 10/2007 | Li et al. |
| 2008/0144612 | A1* | 6/2008 | Honkasalo et al. ........... 370/370 |
| 2009/0196180 | A1 | 8/2009 | Bahl et al. |
| 2009/0316649 | A1 | 12/2009 | Chen |
| 2010/0234040 | A1 | 9/2010 | Palanki et al. |
| 2010/0246455 | A1 | 9/2010 | Nangia et al. |
| 2010/0271965 | A1* | 10/2010 | Siomina et al. ............... 370/252 |
| 2011/0103330 | A1 | 5/2011 | Montojo et al. |
| 2011/0124333 | A1 | 5/2011 | Lotze et al. |
| 2011/0222484 | A1 | 9/2011 | Pedersen et al. |
| 2011/0237288 | A1 | 9/2011 | Ratasuk et al. |
| 2011/0244847 | A1 | 10/2011 | Mallik et al. |
| 2011/0306350 | A1 | 12/2011 | Barbieri et al. |
| 2012/0026972 | A1 | 2/2012 | Miao et al. |
| 2013/0114415 | A1 | 5/2013 | Das et al. |
| 2013/0114433 | A1 | 5/2013 | Park et al. |
| 2013/0114436 | A1 | 5/2013 | Dural et al. |
| 2013/0114473 | A1 | 5/2013 | Awoniyi et al. |
| 2013/0114566 | A1 | 5/2013 | Awoniyi et al. |
| 2013/0114571 | A1 | 5/2013 | Das et al. |
| 2013/0115967 | A1 | 5/2013 | Soliman et al. |
| 2013/0115991 | A1 | 5/2013 | Awoniyi et al. |
| 2013/0115994 | A1 | 5/2013 | Awoniyi et al. |
| 2013/0121265 | A1 | 5/2013 | Awoniyi et al. |
| 2013/0148520 | A1 | 6/2013 | Das et al. |
| 2013/0148527 | A1 | 6/2013 | Awiniyi et al. |
| 2013/0148576 | A1 | 6/2013 | Huang et al. |
| 2013/0148579 | A1 | 6/2013 | Das et al. |
| 2013/0148627 | A1 | 6/2013 | Das et al. |
| 2013/0148628 | A1 | 6/2013 | Das et al. |
| 2013/0148629 | A1 | 6/2013 | Das et al. |
| 2013/0150045 | A1 | 6/2013 | Das et al. |
| 2013/0176952 | A1 | 7/2013 | Shin et al. |
| 2013/0195031 | A1 | 8/2013 | Hessler et al. |
| 2013/0301622 | A1 | 11/2013 | Bahl et al. |
| 2014/0018071 | A1 | 1/2014 | Mennerich et al. |

OTHER PUBLICATIONS

International Search Report and Written Opinion—PCT/US2012/063926—ISA/EPO—Feb. 27, 2013.

NEC Group: "Framework to define additional carrier type: Carrier segments", R1-113227, 3rd Generation Partnership Project (3GPP), Mobile Competence Centre ; 650, Route Des Lucioles ; F-06921 Sophia-Antipolis Cedex ; France, vol. RAN WG1, No. Zhuhai; Oct. 4, 2011, XP050538345.

ZTE: "Discussion on additional carrier types for LTE Rel-11", R1-113003, 3rd Generation Partnership Project (3GPP), Mobile Competence Centre; 650, Route Des Lucioles ; F-06921 Sophia-Antipolis Cedex ; France, vol. RAN WG1, No. Zhuhai; Oct. 4, 2011, XP050538191.

Arslan, et al., "FERMI: A Femtocell Resource Management System for Interference Mitigation in OFDMA Networks," MobiCom '11 Proceedings of the 17th annual international conference on Mobile computing and networking, 2011, pp. 25-36.

* cited by examiner

FLEXIBLE BANDWIDTH SMALL CELLS

CROSS-RELATED APPLICATIONS

The present application for patent is a continuation-in-part of Non-Provisional application Ser. No. 13/466,348 entitled "DYNAMIC BANDWIDTH ADJUSTMENT IN FLEXIBLE BANDWIDTH SYSTEMS" filed May 8, 2012, and assigned to the assignee hereof and hereby expressly incorporated by reference herein for all purposes. The present Application for Patent claims priority to Provisional Application No. 61/556,777 entitled "FRACTIONAL SYSTEMS IN WIRELESS COMMUNICATIONS" filed Nov. 7, 2011, and Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, each of which is assigned to the assignee hereof and hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support 6 different system bandwidths, namely 1.4, 3, 5, 10, 15 and 20 MHz. This may provide one partial solution to the problem. Small cells may provide unique challenges, and opportunities, for under utilized portions of the allocated spectrum.

SUMMARY

Embodiments include methods, systems, and devices for utilizing flexible bandwidth carriers for small cells. In some embodiments, a bandwidth scaling factor for a small cell may be determined. A flexible bandwidth carrier may be generated for the small cell utilizing the bandwidth scaling factor. Some embodiments provide assistance with active hand-in due to more available PN offsets in the flexible bandwidth domain. Some embodiments enhance small cell discovery with generally higher bandwidth scaling factor beacon-like small cells with little more power than that corresponding to the same power spectral density (PSD) for a normal bandwidth small cell. In some cases, a small cell has both a beacon carrier and another carrier, which may be a flexible bandwith carrier or normal bandwidth carrier. In some embodiments, a mobile device moves to the beacon carrier of the small cell and searches for other small cell carriers (e.g., flexible bandwidth carriers). In some embodiments, a small cell may transition its beacon carrier to a flexible wider bandwidth carrier, or even a normal bandwidth carrier. Some embodiments reduce the interference caused by small cell to macrocell users by having an adaptive bandwidth scaling factors for small cells based on the number of users to be supported and their traffic demand, to control the extent of overlap the macro has with small celland thereby the interference to macro mobiles. Some embodiments utilize self configuration for small cells utilizing flexible bandwidth channels.

Flexible bandwidth carriers for wireless communications systems may utilize portions of spectrum that may not be big enough to fit a normal waveform utilizing flexible waveforms. A flexible bandwidth system may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system. A flexible bandwidth carrier may be generated utilizing a bandwidth scaling factor. Some embodiments utilize dilated chips where the chip duration in a flexible bandwidth system is dilated compared to that in a normal bandwidth system; the bandwidth scaling factor may be utilized in some cases.

Some embodiments include a method for implementing flexible bandwidth small cells. The method may include: determining a first bandwidth scaling factor for a small cell; and/or generating a flexible bandwidth carrier for the small cell utilizing the first bandwidth scaling factor. Some embodiments include determining a second bandwidth scaling factor for the small cell; and/or adapting the flexible bandwidth carrier for the small cell from utilizing the first bandwidth scaling factor to utilizing the second bandwidth scaling factor. Some embodiments include determining at least a number of users to be supported by the small cell or a traffic demand for one or more users of the small cell; and/or utilizing at least the determined number of users or the determined traffic demand to determine the first bandwidth scaling factor.

Adapting the flexible bandwidth carrier for the small cell from utilizing the first bandwidth scaling factor to utilizing the second bandwidth scaling factor may increase a bandwidth of the flexible bandwidth carrier to support at least a traffic increase or a quality of service requirement. Some embodiments include changing at least a channel number or center frequency of the small cell when utilizing the flexible bandwidth carrier.

Some embodiments include generating a beacon-like state for the small cell utilizing the flexible bandwidth carrier through altering a transmit power of the small cell utilizing the flexible bandwidth carrier. The transmit power of the small cell utilizing the flexible bandwidth carrier may be less than a transmit power for the small cell utilizing a normal bandwidth carrier. The power spectrum density of the small cell utilizing the flexible bandwidth carrier may be greater than a power spectrum density for the small cell utilizing a normal bandwidth carrier. Generating the beacon-like state for the small cell may enhance a range of the small cell for the user equipment detection of the small cell. Some embodiments include generating a beacon-like state for the small cell utilizing a normal bandwidth carrier. Some embodiments include generating a normal bandwidth carrier for the small cell.

Some embodiments include decreasing a PN offset separation in dilated chips between the small cell and another small cell compared to a PN offset separation for a normal bandwidth carrier based on the bandwidth scaling factor. Decreasing the PN offset separation in dilated chips increases a number of unique PN offsets associated with the small cell and at least one other small cell. Increasing the number of unique PN offsets may result in unique small cell identification that facilitates macrocell to small cell hand-in. Increasing the number of unique PN offsets may result in unique small cell identification that facilitates small cell to small cell handover.

Some embodiment include: determining a portion of a bandwidth channel of a macrocell for the small cell to operate within utilizing the flexible bandwidth carrier; and/or transmitting information regarding the portion of the bandwidth channel for the small cell to operate within. Some embodiments include: receiving information from another small cell regarding a portion of a channel in which the other small cell has determined to operate within utilizing another flexible bandwidth carrier; and/or determining another portion of the channel to operate within based on the received information utilizing the flexible bandwidth carrier. Receiving the information from the other small cell regarding the portion of the channel in which the other small cell has determined to operate within utilizing another flexible bandwidth carrier may utilize a network-utilizing mode of the small cell.

Generating the flexible bandwidth carrier for the small cell utilizing the first bandwidth scaling factor may include generating the flexible bandwidth carrier for uplink, wherein a bandwidth for downlink for the small cell is different from the uplink. Generating the flexible bandwidth carrier for the small cell utilizing the first bandwidth scaling factor may include generating the flexible bandwidth carrier for downlink, wherein a bandwidth for uplink for the small cell is different from the downlink. Some embodiments include changing at least a first channel number or a first center frequency with respect to the uplink and at least a second channel number or a second center frequency with respect to the downlink. Some embodiments include changing at least a channel number or center frequency of the small cell when utilizing the flexible bandwidth carrier when adapting the flexible bandwidth carrier for the small cell from utilizing the first bandwidth scaling factor to utilizing the second bandwidth scaling factor. Some embodiments include utilizing at least the bandwidth scaling factor to facilitate small cell identification.

Some embodiments include a wireless communications system configured for implementing flexible bandwidth small cells. The system may include: means for determining a first bandwidth scaling factor for a small cell; and/or means for generating a flexible bandwidth carrier for the small cell utilizing the first bandwidth scaling factor. Some embodiments include: means for determining a second bandwidth scaling factor for the small cell; and/or means for adapting the flexible bandwidth carrier for the small cell from utilizing the first bandwidth scaling factor to utilizing the second bandwidth scaling factor. Some embodiments include: means for determining at least a number of users to be supported by the small cell or a traffic demand for one or more users of the small cell; and/or means for utilizing at least the determined number of users or the determined traffic demand to determine the first bandwidth scaling factor. Some embodiments include means for changing a channel number of the small cell when utilizing the flexible bandwidth carrier.

Some embodiments include means for generating a beacon-like state for the small cell utilizing the flexible bandwidth carrier through altering a transmit power of the small cell utilizing the flexible bandwidth carrier. Some embodiments include means for decreasing a PN offset separation in dilated chips between the small cell and another small cell compared to a PN offset separation for a normal bandwidth carrier based on the bandwidth scaling factor. Some embodiments include: means for determining a portion of a bandwidth channel of a macrocell for the small cell to operate within utilizing the flexible bandwidth carrier; and/or means for transmitting information regarding the portion of the bandwidth channel for the small cell to operate within. Some embodiments include: means for receiving information from another small cell regarding a portion of a channel in which the other small cell has determined to operate within utilizing another flexible bandwidth carrier; and/or means for determining another portion of the channel to operate within based on the received information utilizing the flexible bandwidth carrier.

Some embodiments include a computer program product for implementing flexible bandwidth small cells that include a non-transitory computer-readable medium that may include: code for determining a first bandwidth scaling factor for a small cell; and/or code for generating a flexible bandwidth carrier for the small cell utilizing the first bandwidth scaling factor. The non-transitory computer-readable medium may include: code for determining a second bandwidth scaling factor for the small cell; and/or code for adapting the flexible bandwidth carrier for the small cell from utilizing the first bandwidth scaling factor to utilizing the second bandwidth scaling factor. The non-transitory computer-readable medium may include: code for determining at least a number of users to be supported by the small cell or a traffic demand for one or more users of the small cell; and/or code for utilizing at least the determined number of users or the determined traffic demand to determine the first bandwidth scaling factor. The non-transitory computer-readable medium may include code for changing a channel number of the small cell when utilizing the flexible bandwidth carrier.

In some embodiments, the non-transitory computer-readable medium includes code for generating a beacon-like state for the small cell utilizing the flexible bandwidth carrier through altering a transmit power of the small cell utilizing the flexible bandwidth carrier. The non-transitory computer-readable medium may include code for decreasing a PN offset separation in dilated chips between the small cell and another small cell compared to a PN offset separation for a normal bandwidth carrier based on the bandwidth scaling factor. The non-transitory computer-readable medium may include: code for determining a portion of a bandwidth channel of a macrocell for the small cell to operate within utilizing the flexible bandwidth carrier; and/or code for transmitting information regarding the portion of the bandwidth channel for the small cell to operate within.

In some embodiments, the non-transitory computer-readable medium includes: code for receiving information from another small cell regarding a portion of a channel in which the other small cell has determined to operate within utilizing another flexible bandwidth carrier; and/or code for determining another portion of the channel to operate within based on the received information utilizing the flexible bandwidth carrier.

Some embodiments include a wireless communications device configured for implementing flexible bandwidth small cells. The wireless communications device may include at least one processor configured to: determine a first bandwidth scaling factor for a small cell; and/or generate a flexible bandwidth carrier for the small cell utilizing the first bandwidth scaling factor. The at least one processor may be configured to: determine a second bandwidth scaling factor for the small cell; and/or adapt the flexible bandwidth carrier for the small cell from utilizing the first bandwidth scaling factor to utilizing the second bandwidth scaling factor. The at least one processor may be configured to: determine at least a number of users to be supported by the small cell or a traffic demand for one or more users of the small cell; and/or utilize at least the determined number of users or the determined traffic demand to determine the first bandwidth scaling factor. The at least one processor may be configured to: change a channel number of the small cell when utilizing the flexible bandwidth carrier.

In some embodiments, the at least one processor may be configured to generate a beacon-like state for the small cell utilizing the flexible bandwidth carrier through altering a transmit power of the small cell utilizing the flexible bandwidth carrier. The at least one processor may be configured to decrease a PN offset separation in dilated chips between the small cell and another small cell compared to a PN offset separation for a normal bandwidth carrier based on the bandwidth scaling factor. The at least one processor may be configured to: determine a portion of a bandwidth channel of a macrocell for the small cell to operate within utilizing the flexible bandwidth carrier; and/or transmit information regarding the portion of the bandwidth channel for the small cell to operate within.

The at least one processor may be configured to: receive information from another small cell regarding a portion of a channel in which the other small cell has determined to operate within utilizing another flexible bandwidth carrier; and/or determine another portion of the channel to operate within based on the received information utilizing the flexible bandwidth carrier. The wireless communications device may include small cell.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
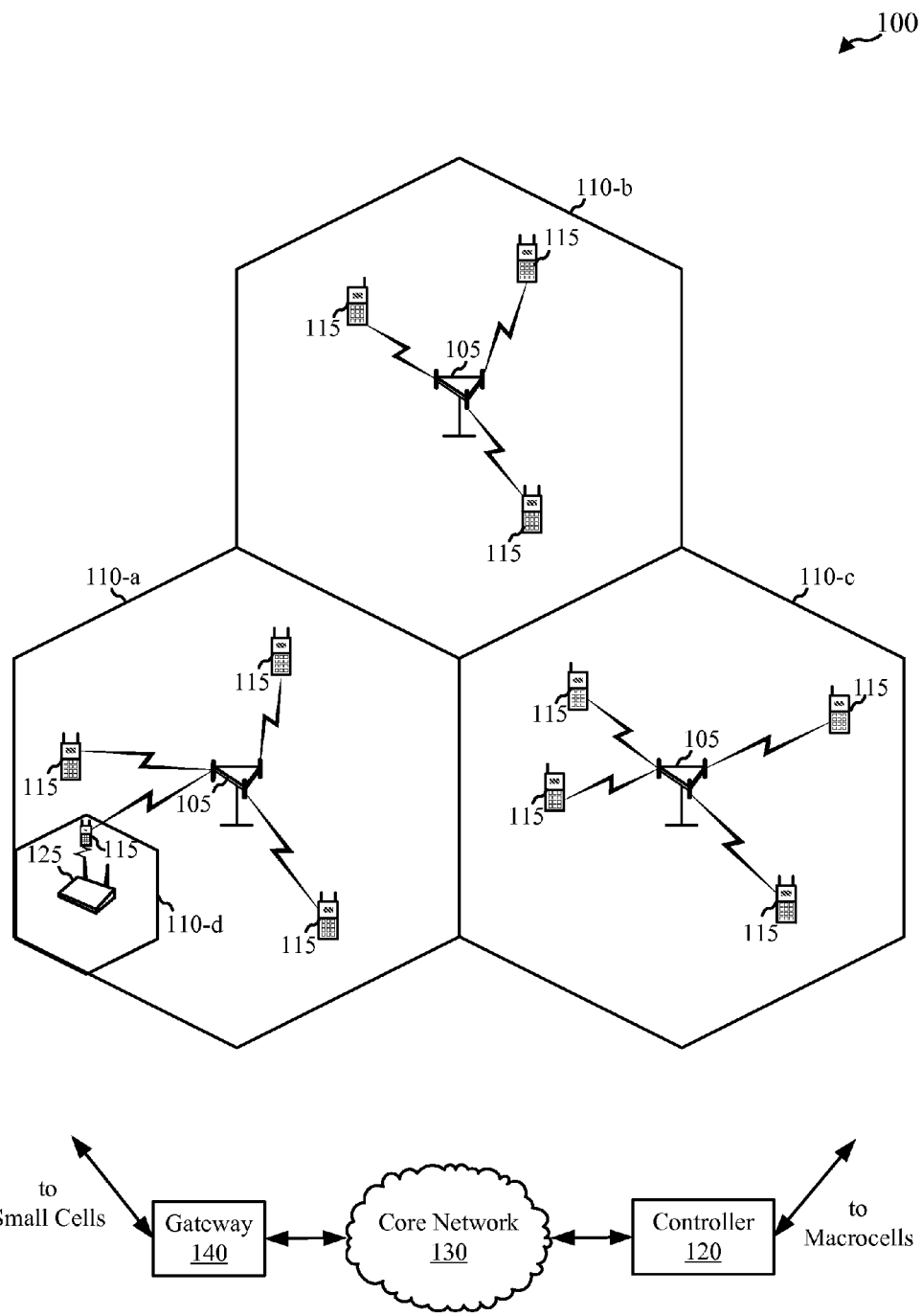
FIG. 1 shows a block diagram of a wireless communications system in accordance with various embodiments.

Embodiments include methods, systems, and devices for utilizing flexible bandwidth carriers for small cells. Flexible bandwidth small cells may be utilized for a variety of purposes. For example, flexible bandwidth small cells may provide a more reliable mechanism for handing in mobile devices from macrocell to small cell. Flexible bandwidth small cells may address small cell discovery issues where a mobile device currently being served by a macrocell cannot reliably detect the small cell in its vicinity. Flexible bandwidth small cells may address interference issues where small cell users may experience and/or cause significant interference when deployed in the same channel as the macrocells (e.g., co-channel deployments). In some embodiments, a bandwidth scaling factor for a small cell may be determined. A flexible bandwidth carrier may be generated for the small cell utilizing the bandwidth scaling factor.

Some embodiments provide assistance with active hand-in due to more available PN offsets in the flexible bandwidth domain. Utilizing scaling associated with flexible bandwidth for small cells may result in needing lower separation in PN offset in dilated chips for flexible bandwidth small cells. For example, a PN offset separation in dilated chips between the small cell and another flexible bandwidth small cell may be decreased compared to a PN offset separation in chips for a normal bandwidth carrier based on the bandwidth scaling factor. In general, for a bandwidth scaling factor N small cell, there may be N times more available PN offsets. If macrocell uses full bandwidth carrier and small cells use flexible bandwidth carrier, then the flexible bandwidth small cells may have the entire PN offset space when the bandwidth scaling factor is not 1 (i.e., not full bandwidth). The increase in usable PN offset space for flexible bandwidth small cells may allow lower chances of same PN offset being used by small cells in a given geographical area and may help mitigate the PN offset confusion problem. This may result in unique determination of target small cell for macrocell to small cell hand-in scenarios.

Some embodiments enhance small cell discovery with high bandwidth scaling factor beacon-like small cells with little more power than that corresponding to the same power spectral density (PSD) for a normal bandwidth small cell. Generating a beacon-like state for the small cell over the flexible bandwidth carrier may involve altering a transmit power of the small cell over the flexible bandwidth carrier. In general, this transmit power may be less than the transmit power that a small cell would utilize for a normal bandwidth channel. The flexible bandwidth beacon-like small cell's coverage range may be greater than a normal bandwidth small cell due to higher PSD and thereby the small cell might be detected by macrocell UEs that support flexible bandwidth system from a greater distance. Alternately, the higher power spectral density (PSD) may allow a UE to more readily detect the small cell at the same distance from the small cell without a beacon-like feature.

Some embodiments reduce the interference caused by small cell to macrocell users by having an adaptive N for small cells based on the number of users to be supported and/or their traffic demands, to control the extent of overlap the macro has with small cell, or small cell to other small cellss, and thereby the interference to macro mobiles or other small cell mobiles. Normal bandwidth small cells generally have 100% overlap with macrocell for co-channel deployment. For example, when there are no users on the small cell, the small cell could switch to N=4 (or 8) for 1X/DO and N=8 (or 16) for UMTS. This may be like a beacon of the small cell with the exception that it can support services with bare minimum QoS (as it is the small cell signal itself). A small cell can switch to a lower N i.e. more BW, all the way down to N=1 if it may need to support more traffic or meet QoS requirements of small cell mobile devices. This may reduce the co-channel interference as seen by nearby macrocell mobile devices. Earlier, a macrocell mobile device may have seen interference in the entire channel but now a macrocell mobile device may see interference in a portion of the channel.

Some embodiments utilize self configuration for small cells utilizing flexible bandwidth channels. It may be desirable for neighboring small cells to not operate in the same sub-band when they are operating in N>1 modes. For example, one small cell may determine a portion of a normal bandwidth channel of a macrocell for the small cell to operate within utilizing the flexible bandwidth carrier. Multiple small cells may coordinate which portions of the normal bandwidth channel they utilize, such as through transmitting information regarding the portion of the normal bandwidth channel for a first small cell to operate within. As a result, a second small cell may receive this information from the first small cell regarding the portion of the normal channel in which the first small cell has determined to operate within utilizing a flexible bandwidth carrier. The second small cell may determine another portion of the normal channel to operate within, based on the received information utilizing the flexible bandwidth carrier.

Flexible bandwidth carriers and/or waveforms for wireless communications systems may utilize portions of spectrum that may not be big enough to fit a normal waveform utilizing flexible waveforms. A flexible bandwidth system may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system.

The flexible bandwidth small cells may utilize different flexible bandwidths for uplink and downlink. In one embodiment, one of uplink or downlink can be full bandwidth carrier while the other is flexible bandwidth carrier with bandwidth scaling factor greater than 1. If the traffic is more in downlink, then downlink could be full bandwidth and vice versa. For example, flexible bandwidth small cells may utilize flexible bandwidths for downlink and uplink to conserve energy when the quality of service requirements of small cell mobiles can be met with flexible bandwidth carriers.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 may include macrocell base stations 105, mobile devices 115, a base station controller 120, small cells 125, and/or a core network 130 (the controller 120 may be integrated into the core network 130). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term user mobile device should be interpreted broadly hereinafter, including the claims, to include any type of wireless or mobile communications device.

The macrocell base stations 105 may wirelessly communicate with the mobile devices 115 via one or more base station antennas. The mobile device 115 may receive timing information from the macrocell base station 105 in accordance with various embodiments. The macrocell base stations 105 may be configured to communicate with the mobile devices 115 under the control of the controller 120 via multiple carriers. The controller 120 may also be in communication with the core network 130. Each of the base station 105 sites can provide communication coverage for a respective geographic area. In some embodiments, macrocell base stations 105 may be referred to as a Node B. The coverage area for each macrocell base station 105 here is identified as 110-a, 110-b, or 110-c. The coverage area for a base station may be divided into sectors (not shown, but making up only a portion of the coverage area). The system 100 may include base stations 105 of different types (e.g., macro, micro, and/or pico base stations). As used herein, the term "cell" may refer to 1) a sector, or 2) a site (e.g., a base station 105). Thus, the term "macrocell" may refer to 1) a macrocell sector, 2) a macrocell base station (e.g., macrocell base station 105), and/or 3) a macrocell controller. Thus, the term "small cell" may refer to 1) a small cell sector, or 2) a small cell base station (e.g., small cell access point). The term "small cell" may also include, but is not limited to, femtocells, microcells, and/or picocells.

For the discussion below, the mobile devices 115 operate on (are "camped on") a macrocell or similar network facilitated by multiple macrocell base stations 105. In some embodiments, a mobile device 115 may be referred to as being associated with a macrocell base station 105 when it is camped on the macrocell base station 105. Each macrocell base station 105 may cover a relatively large geographic area (e.g., hundreds of meters to several kilometers in radius) and may allow unrestricted access by terminals with service subscription. A portion of the mobile devices 115 may also be registered to operate (or otherwise allowed to operate) in small cell coverage area 110-d (e.g., communicating with small cell 125, which may be referred to as a small cell access point (FAP) or a home node B (HNB) in some cases), within the coverage area of a macrocell 110-a. As a mobile device 115 approaches a small cell 125, there may be need for mechanisms so that the mobile device 115 may migrate to the small cell 125 from the macrocell base station 105. For example, the mobile device 115 may provide one or more timing offsets to the small cell 125 such that the small cell 125 may synchronize with the macrocell base station 105 that the mobile device 115 is currently camped on. This may facilitate a hand-in of the mobile device 115 from the macrocell base station 105 to the small cell 125. The small cells 125 may communicate with a gateway 140 that may aggregate traffic from multiple small cells 125. The gateway 140 may then route the traffic of the small cells 125 to the core network 130. The gateway 140 may be referred to as a small cell gateway 140 in some cases. In some embodiments, the gateway 140 may include a Home Location Register (HLR). The gateway 140 may be considered as being part of the core network 130 in some embodiments.

Strategic deployment of small cells may be used to mitigate mobile device power consumption, as mobile devices typically operate using an internal power supply, such as a small battery, to facilitate highly mobile operation. Small cells may be used to offload traffic and reduce spectrum usage at a macrocell. Small cells may also be utilized to provide service within areas which might not otherwise experience adequate or even any service (e.g., due to capacity limitations, bandwidth limitations, signal fading, signal shadowing, etc.), thereby allowing mobile devices to reduce searching times, to reduce transmit power, to reduce transmit times, etc. A small cell 125 may provide service within a relatively small service area (e.g., within a house or building). Accordingly, a mobile device 115 may be typically deployed near a small cell 125 when being served, often allowing the mobile device 115 to communicate with reduced transmission power. Conserving power and creating less interference to other users may also result. Also, this may potententially allow users to get a higher date rate or quality of service (QoS).

In some cases, the small cell 125 may be implemented as a Home Node B ("HNB") or Home eNode B (HeNB), and located in a user premises, such as a residence, an office building, etc. Small cell 125 may be used hereinafter generically to describe any small cell access point, and should not be interpreted as limiting. A set of mobile devices 115 may be registered on (e.g., on a whitelist of) a single small cell (e.g., small cell 125) that provides coverage over substantially an entire user premises. The "home" small cell 125 may provide the mobile device 115 with access to communication services via a connection to the macrocell communications network. As used herein, the macrocell communications network is assumed to be a wireless wide-area network (WWAN). As such, terms like "macrocell network" and "WWAN network" are interchangeable. Similar techniques may be applied to other types of network environments, small cell coverage topologies, etc., without departing from the scope of the disclosure or claims.

The different aspects of system 100, such as the small cells 125, the gateway 140, the mobile devices 115, the base stations 105, the core network 130, and/or the controller 120 may be configured to utilize flexible bandwidth and waveforms in accordance with various embodiments. System 100, for example, shows transmissions 125 between mobile devices 115 and base stations 105. The transmissions 125 may include uplink and/or reverse link transmissions, from a mobile device 115 to a small cell 125 and/or a base station 105, and/or downlink and/or forward link transmissions, from a small cell 125 and/or a base station 105 to a mobile device 115. The transmissions 125 may include flexible and/or normal waveforms. Normal waveforms may also be referred to as legacy and/or normal waveforms.

The different aspects of system 100, such as small cell 125, the mobile devices 115, the base stations 105, the core network 130, the gateway 140, and/or the controller 120 may be configured to utilize flexible bandwidth and waveforms in accordance with various embodiments. For example, different aspects of system 100 may utilize portions of spectrum that may not be big enough to fit a normal waveform. Devices such as small cells 125, the mobile devices 115, the base stations 105, the core network 130, the gateway 140, and/or the controller 120 may be configured to adapt the chip rates, spreading factor, and/or bandwidth scaling factors to generate and/or utilize flexible bandwidth and/or waveforms. Some aspects of system 100 may form a flexible subsystem (such as certain small cells 125, mobile devices 115, and/or base stations 105) that may be generated with respect to a normal subsystem (that may be implemented using other small cells 125, mobile devices 115, and/or base stations 105) through dilating, or scaling down, the time of the flexible subsystem with respect to the time of the normal subsystem.

In some embodiments, different aspects of system 100, such as the small cells 125, the mobile devices 115, the base stations 105, the core network 130, the gateway 140, and/or the controller 120 may be configured for implementing flexible bandwidth for a small cell. For example, the small cell 125 may be configured to generate a flexible bandwidth carrier for the small cell. In some embodiments, the small cell 125 may utilize a first bandwidth scaling factor to generate the flexible bandwidth carrier. In some embodiments, the small cell 125 determines the first bandwidth scaling factor for the small cell.

In some embodiments, the small cell 125 determines additional bandwidth scaling factors, such as the second bandwidth scaling factor for the small cell. The small cell 125 may adapt the flexible bandwidth carrier for the small cell from utilizing the first bandwidth scaling factor to utilizing another bandwidth scaling factor, such as the second bandwidth scaling factor. In some embodiments, adapting the flexible bandwidth carrier for the small cell from utilizing the first bandwidth scaling factor to utilizing the second bandwidth scaling factor increases a bandwidth of the flexible bandwidth carrier to support at least a traffic increase or a quality-of-service requirement.

In some embodiments, the small cell 125 determines at least a number of users to be support by the small cell or a traffic demand for one or more users of the small cell. The small cell 125 may utilize at least the determined number of users or the determined traffic demand to determine the first bandwidth scaling factor. The small cell 125 may change a channel number of the small cell when utilizing the flexible bandwidth carrier.

The small cell 125 may generate a beacon-like state for the small cell utilizing the flexible bandwidth carrier through altering a transmit power of the small cell utilizing the flexible bandwidth carrier. In some embodiments, the transmit power of the small cell utilizing the flexible bandwidth carrier is less than a transmit power for the small cell utilizing a normal bandwidth carrier. In some embodiments, the power spectrum density of the small cell utilizing the flexible bandwidth carrier is greater than a power spectrum density for the small cell utilizing a normal bandwidth carrier. The small cell 125 may generate the beacon-like state for the small cell to enhance a range of the small cell for small cell detection. Unlike a classical beacon, the terminal may be able to communicate with the base station in this state.

In some embodiments, the small cell 125 is configured to decrease a PN offset separation in dilated chips between the small cell and another small cell compared to a PN offset separation for a normal bandwidth carrier based on the bandwidth scaling factor. Decreasing the PN offset separation in dilated chips may increase a number of unique PN offsets associated with the small cell and at least one other small cell. Increasing the number of unique PN offsets may result in unique small cell identification that facilitates macrocell to small cell hand-in.

The small cell 125 may be configured to determine a portion of a normal bandwidth channel of a macrocell for the small cell to operate within utilizing the flexible bandwidth carrier. The small cell 125 may be configured to transmit information regarding the portion of the normal bandwidth channel for the small cell to operate within. In some embodiments, the small cell 125 is configured to receive information from another small cell regarding a portion of a normal channel in which the other small cell has determined to operate within utilizing another flexible bandwidth carrier. The small cell 125 may determine another portion of the normal channel to operate within based on the received information utilizing the flexible bandwidth carrier. The information from the other small cell regarding the portion of the normal channel in which the other small cell has determined to operate within, utilizing another flexible bandwidth carrier may utilize the small cell's network utilizing mode.

The flexible bandwidth small cells 125 may utilize different flexible bandwidths for uplink and downlink. For example, different bandwidth scaling factors may be utilized for the uplink and the downlink. In one embodiment, one of uplink or downlink can be full bandwidth carrier while the other is flexible bandwidth carrier with bandwidth scaling factor greater than 1. If the traffic is more in downlink, then downlink could be full bandwidth and vice versa. For example, flexible bandwidth small cells may utilize flexible bandwidths for downlink and uplink to conserve energy when the quality of service requirements of small cell mobiles can be met with flexible bandwidth carriers.

Figure 2A:
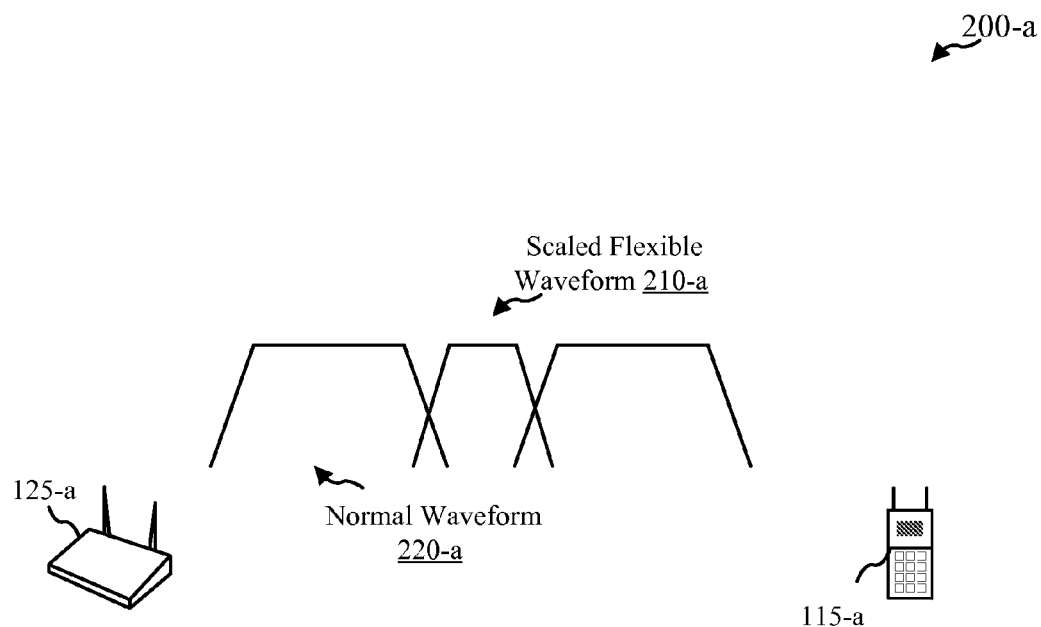
FIG. 2A shows an example of a wireless communications system where a flexible waveform fits into a portion of spectrum not broad enough to fit a normal waveform in accordance with various embodiments.
Figure 2B:
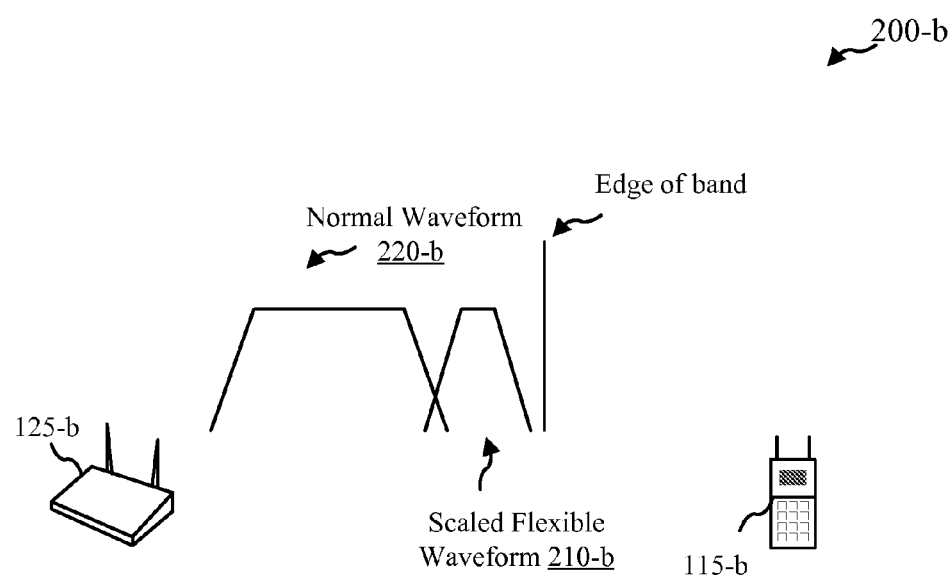
FIG. 2B shows an example of a wireless communications system where a flexible waveform fits into a portion of spectrum near an edge of a band in accordance with various embodiments.

FIG. 2A shows an example of a wireless communications system 200-a with a small cell 125-a and a mobile device 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a that either the small cell 125-a and/or the mobile device 115-a may transmit. In some cases, the normal waveform 220-a may completely overlap the flexible waveform 210-a. Some embodiments may also utilize multiple flexible waveforms 210. In some embodiments, another small cell and/or mobile device (not shown) may transmit the normal waveform 220-a and/or the flexible waveform 210-a. FIG. 2B shows an example of a wireless communications system 200-b with a small cell 125-b and a mobile device 115-b, where a flexible waveform 210-b fits into a portion of spectrum near an edge of a band, which may be a guard band, where normal waveform 220-b may not fit. System 200-b may be an example of system 100 of FIG. 1. Mobile devices 115-a/115-b and/or small cells 125-a/125-b may be configured to adjust the bandwidth of the flexible waveforms 210-a/210-b in accordance with various embodiments.

Figure 2C:
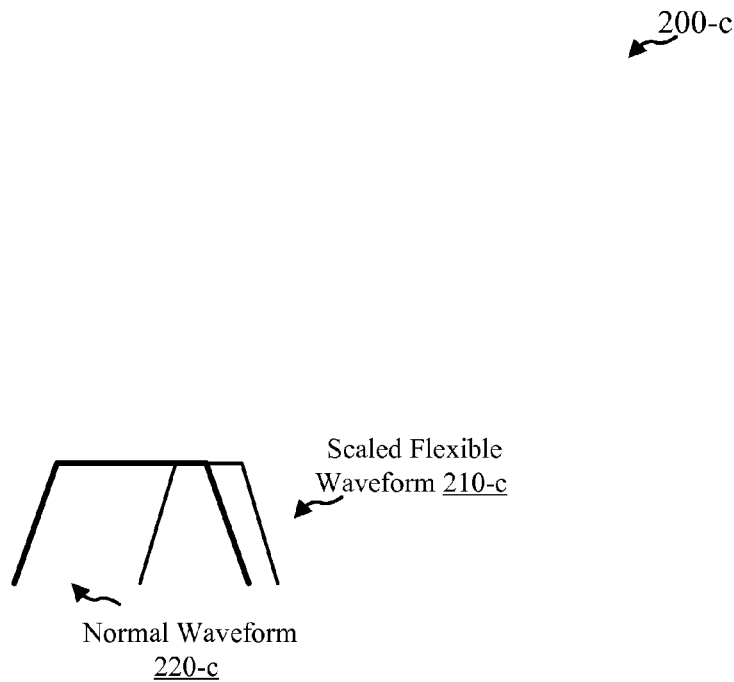
FIG. 2C shows an example of a wireless communications system where a flexible waveform partially overlaps a normal waveform in accordance with various embodiments.
Figure 2D:
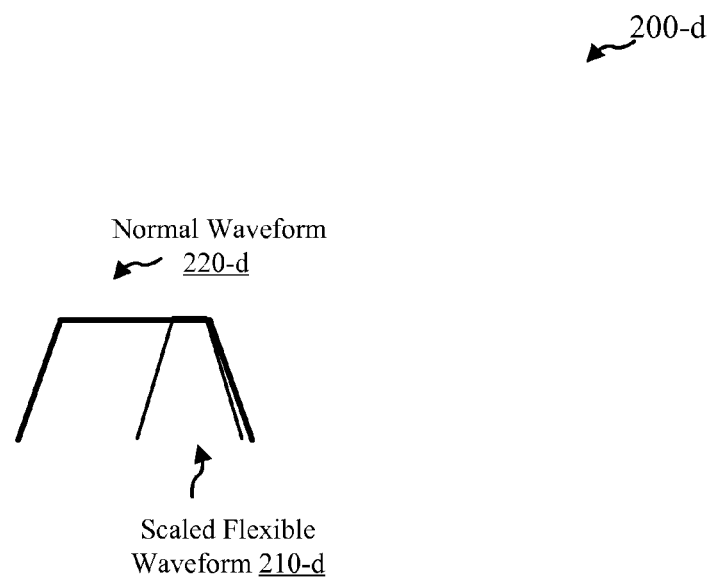
FIG. 2D shows an example of a wireless communications system where a flexible waveform is completely overlapped by a normal waveform in accordance with various embodiments.
Figure 2E:
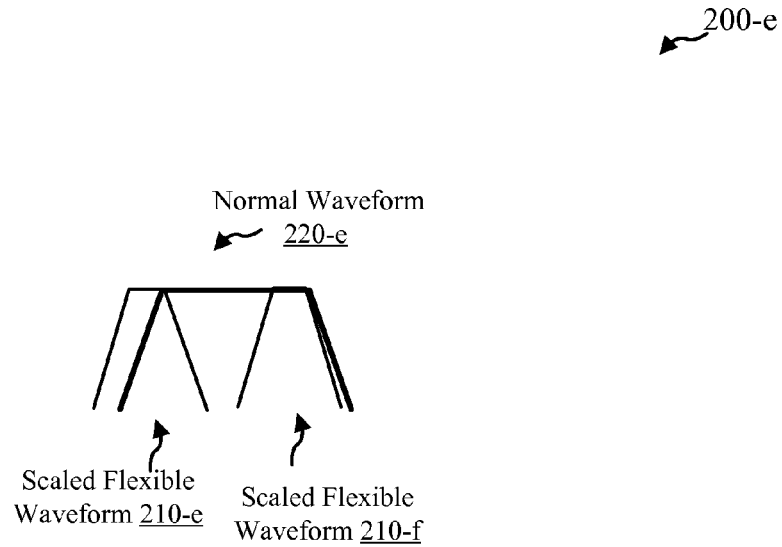
FIG. 2E shows an example of a wireless communications system where one flexible waveform is completely overlapped by a normal waveform and another flexible waveform partially overlaps a normal waveform in accordance with various embodiments.
Figure 2F:
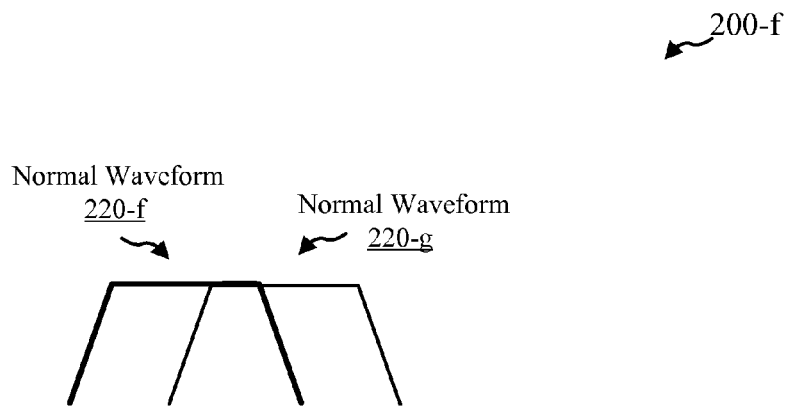
FIG. 2F shows an example of a wireless communications system where one normal waveform partially overlaps another normal waveform in accordance with various embodiments.
Figure 2G:
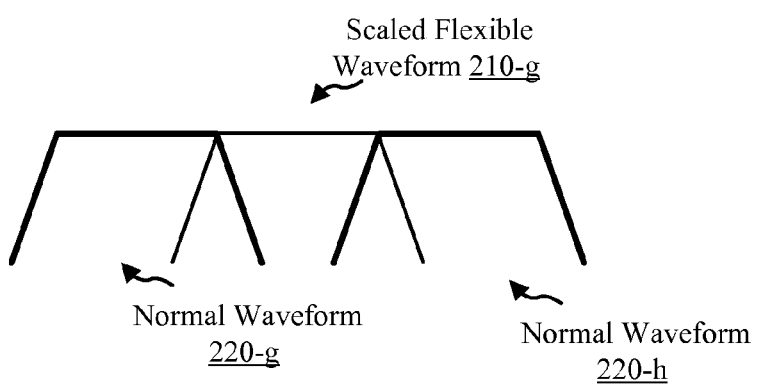
FIG. 2G shows an example of a wireless communications system where one flexible waveform partially overlaps two normal waveforms in accordance with various embodiments.

FIG. 2C shows an example of a wireless communications system 200-c where a flexible waveform 210-c partially overlaps a normal waveform 220-c in accordance with various embodiments. System 200-c may be an example of system 100 of FIG. 1. FIG. 2D shows an example of a wireless communications system 200-d where a flexible waveform 210-d is completely overlapped by a normal waveform 220-d in accordance with various embodiments. System 200-d may be an example of system 100 of FIG. 1. FIG. 2E shows an example of a wireless communications system 200-e where one flexible waveform 210-f is completely overlapped by a normal waveform 220-e and another flexible waveform 210-e partially overlaps the normal waveform 220-e in accordance with various embodiments. System 200-e may be an example of system 100 of FIG. 1. FIG. 2F shows an example of a wireless communications system 200-f where one normal waveform 220-f partially overlaps another normal waveform 220-g in accordance with various embodiments. System 200-f may be an example of system 100 of FIG. 1. FIG. 2G shows an example of a wireless communications system 200-g where two normal waveforms 220-g/220-h and a flexible waveform 210-g that partially overlaps both waveforms 220-g and 220-h in accordance with various embodiments. System 200-f may be an example of system 100 of FIG. 1.

Systems 200-c, 200-d, 200-e, 200-f, and/or 200-g may be configured such that the bandwidth of the flexible waveforms 210-c, 210-d, 210-e, 210-f, and/or 210-g may be dynamically adjusted in accordance with various embodiments.

The flexible bandwidth small cells and waveforms shown above may not necessary transmit multiple carriers, though they may. The adjacent waveform(s) may be coming from another cell (macrocell or small cell, for example). The PSD received (and even transmitted) may be different.

In general, a first waveform or carrier bandwidth and a second waveform or carrier bandwidth may partially overlap when they overlap by at least 1%, 2%, and/or 5%. In some embodiments, partial overlap may occur when the overlap is at least 10%. In some embodiments, the partial overlap may be less than 99%, 98%, and/or 95%. In some embodiments, the overlap may be less than 90%. In some cases, a flexible waveform or carrier bandwidth may be contained completely within another waveform or carrier bandwidth such as seen in system 200-d of FIG. 2. This overlap still reflects partial overlap, as the two waveforms or carrier bandwidths do not completely coincide. In general, partial overlap can mean that the two or more waveforms or carrier bandwidths do not completely coincide (i.e., the carrier bandwidths are not the same).

Some embodiments may utilize different definitions of overlap based on power spectrum density (PSD). For example, one definition of overlap based on PSD is shown in the following overlap equation for a first carrier:

$$\text{overlap} = 100\% * \sqrt{\frac{\int_0^\infty PSD_1(f) * PSD_2(f)}{\int_0^\infty PSD_1(f) * PSD_1(f)}}.$$

In this equation, $PSD_1(f)$ is the PSD for a first waveform or carrier bandwidth and $PSD_2(f)$ is the PSD for a second waveform or carrier bandwidth. When the two waveforms or carrier bandwidths coincide, then the overlap equation may equal 100%. When the first waveform or carrier bandwidth and the second waveform or carrier bandwidth at least partially overlap, then the overlap equation may not equal 100%. For example, the overlap equation may result in a partial overlap of greater than or equal to 1%, 2%, 5%, and/or 10% in some embodiments. The overlap equation may result in a partial overlap of less than or equal to 99%, 98%, 95%, and/or 90% in some embodiments. One may note that in the case in which the first waveform or carrier bandwidth is a normal waveform or carrier bandwidth and the second waveform or a carrier waveform is a flexible waveform or carrier bandwidth that is contained within the normal bandwidth or carrier bandwidth, then the overlap equation may represent the ratio of the flexible bandwidth compared to the normal bandwidth, written as a percentage. Furthermore, the overlap equation may depend on which carrier bandwidth's perspective the overlap equation is formulated with respect to. Some embodiments may utilize other definitions of overlap. In some cases, another overlap may be defined utilizing a square root operation such as the following:

$$\text{overlap} = 100\% * \sqrt{\frac{\int_0^\infty PSD_1(f) * PSD_2(f)}{\int_0^\infty PSD_1(f) * PSD_1(f)}}.$$

Other embodiments may utilize other overlap equations that may account for multiple overlapping carriers.

Figure 3:
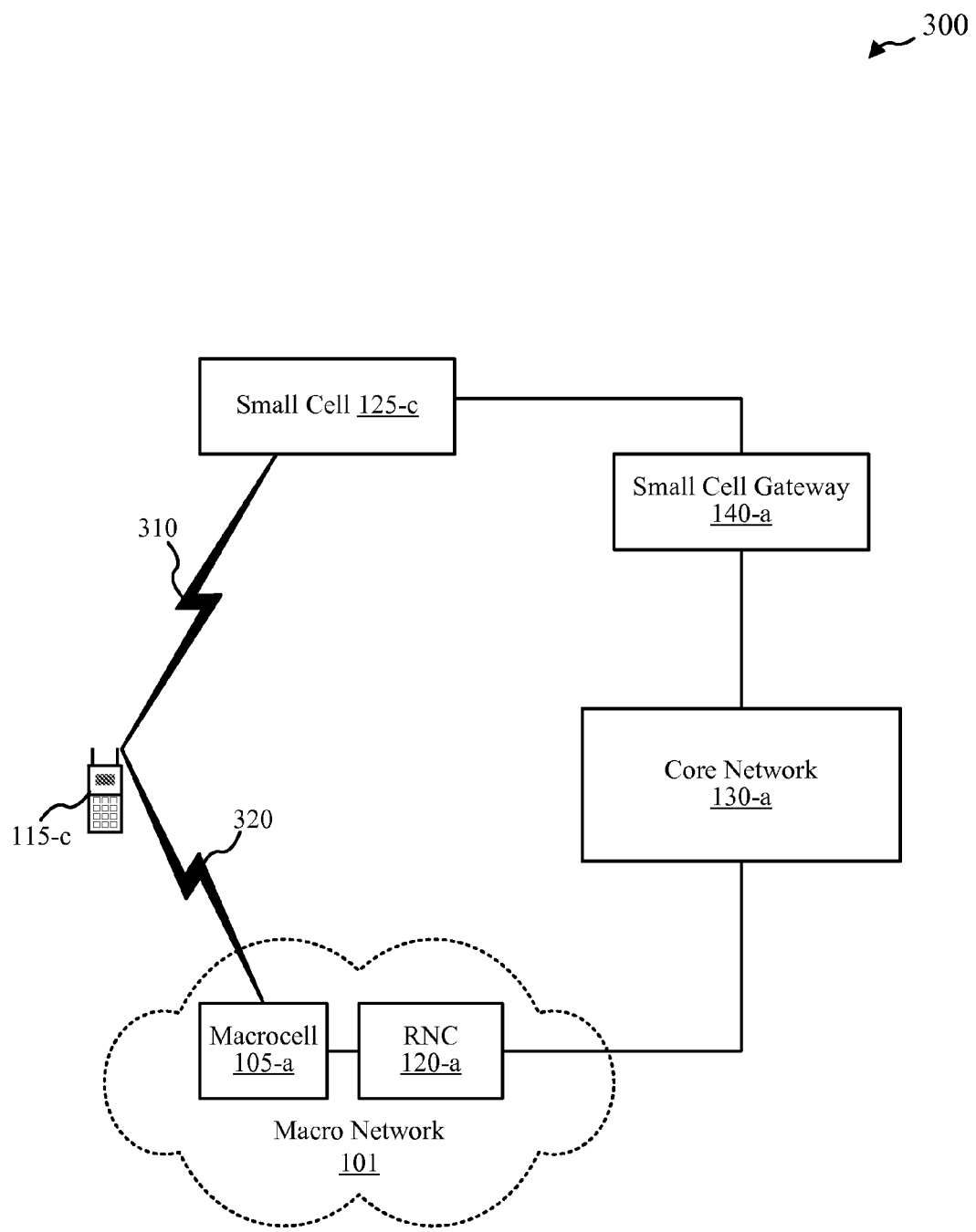
FIG. 3 shows a network diagram of wireless communications system in accordance with various embodiments.

Turning to FIG. 3, a network diagram is shown of a wireless communications system 300 for providing for small cell 125-c to utilize flexible bandwidth carrier. Communications system 300 may be an example of the communications system 100 of FIG. 1.

The communications system 300 may include a macro network 101, small cell 125-c, a core network 130-a, a small cell gateway 140-a, and one or more mobile devices 115-c. The core network 130-a may include the small cell gateway 140-a in some cases (which may be a Home Location Register (HLR), in some cases). The core network 130-a may include a Serving GPRS Support Node (SGSN, not shown) and/or Mobile Switching Center (MSC, not shown). In some embodiments, the small cell gateway 140-a may be considered outside the core network 130-a. The small cell gateway 140-a may be in communication with a number of small cells 125-c (only one small cell 125-c is shown for clarity), and the core network 130-a may be in communication with multiple macrocell base stations 105-a via one or more macro RNCs 120-a (only one macrocell base station 105-a is show for clarity). The small cell 125-c may be in communication with the macro network 101 via core network 130-a elements, such that cellular communications may be facilitated through the small cell 125-c using functionality of the small cell gateway 140-c and/or core network 130-a.

The small cell 125-c may be configured for implementing flexible bandwidth for a small cell. For example, the small cell 125-c may be configured to generate a flexible bandwidth carrier for the small cell. In some embodiments, the small cell 125-c may utilize a first bandwidth scaling factor to generate the flexible bandwidth carrier. In some embodiments, the small cell 125-c determines the first bandwidth scaling factor for the small cell.

In some embodiments, the small cell 125-c determines additional bandwidth scaling factors, such as second bandwidth scaling factor for the small cell. The small cell 125-c may adapt the flexible bandwidth carrier for the small cell from utilizing the first bandwidth scaling factor to utilizing another bandwidth scaling factor, such as the second bandwidth scaling factor. In some embodiments, adapting the flexible bandwidth carrier for the small cell from utilizing the first bandwidth scaling factor to utilizing the second bandwidth scaling factor increases a bandwidth of the flexible bandwidth carrier to support at least a traffic increase or a quality of service requirement.

In some embodiments, the small cell 125-c determines at least a number of users to be support by the small cell or a traffic demand for one or more users of the small cell. The small cell 125-c may utilize at least the determined number of users or the determined traffic demand to determine the first bandwidth scaling factor. The small cell 125-c may change a channel number of the small cell when utilizing the flexible bandwidth carrier.

The small cell 125-c may generate a beacon-like state for the small cell utilizing the flexible bandwidth carrier through altering a transmit power of the small cell utilizing the flexible bandwidth carrier. In some embodiments, the transmit power of the small cell utilizing the flexible bandwidth carrier is less than a transmit power for the small cell utilizing a normal bandwidth carrier. In some embodiments, the power spectrum density of the small cell utilizing the flexible bandwidth carrier is greater than a power spectrum density for the small cell utilizing a normal bandwidth carrier. The small cell 125-c may generate the beacon-like state for the small cell to enhance a range of the small cell for small cell detection.

In some embodiments, the small cell 125-c is configured to decrease a PN offset separation in dilated chips between the small cell and another small cell compared to a PN offset separation for a normal bandwidth carrier based on the bandwidth scaling factor. Decreasing the PN offset separation in dilated chips may increase a number of unique PN offsets associated with the small cell and at least one other small cell. Increasing the number of unique PN offsets may result in unique small cell identification that facilitates macrocell to small cell hand-in. This may also help with small cell-to-small cell hand-off.

The small cell 125-c may be configured to determine a portion of a normal bandwidth channel of a macrocell for the small cell to operate within utilizing the flexible bandwidth carrier. The small cell 125-c may be configured to transmit information regarding the portion of the normal bandwidth channel for the small cell to operate within. In some embodiments, the small cell 125-c is configured to receive information from another small cell regarding a portion of a normal channel in which the other small cell has determined to operate within utilizing another flexible bandwidth carrier. The small cell 125-c may determine another portion of the normal channel to operate within based on the received information utilizing the flexible bandwidth carrier. The information from the other small cell regarding the portion of the normal channel in which the other small cell has determined to operate within utilizing another flexible bandwidth carrier may utilize the small cell's network utilizing mode.

Some embodiments may utilize additional terminology. A new unit D may be utilized. The unit D is dilated. The unit is unitless and has the value of N. One can talk about time in the flexible system in terms of "dilated time". For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds". Some embodiments may utilize "dilated chips" where the chip duration in a flexible bandwidth system is dilated compared to that in a normal bandwidth system by a factor equal to the bandwidth scaling factor.

As discussed above, a flexible waveform may be a waveform that occupies less or more bandwidth than a normal waveform. Thus, in a flexible bandwidth system, the same number of symbols and bits may be transmitted over a longer duration compared to normal bandwidth system. This may result in time stretching, whereby slot duration, frame duration, etc., may increase by a bandwidth scaling factor N. Bandwidth scaling factor N may represent the ratio of the normal bandwidth to flexible bandwidth (BW). Thus, data rate in a flexible bandwidth system may equal (Normal Rate× 1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a bandwidth scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a bandwidth scaling factor that may be not equal to one (e.g., N=2, 4, 8, ½, ¼, etc.). For N>1, or if a chip rate is decreased, the bandwidth of a waveform may decrease. Some embodiments may utilize bandwidth scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

In some cases, small cells are deployed in the same frequency as other cells (e.g., macrocells). For co-channel macro-small cell deployments, interference may be a problem. For example, a macrocell mobile device near small cell coverage, but not allowed access on the small cell, may see interference from the small cell. Other interference issues may be seen co-channel deployments. Some embodiments provide tools and techniques that aim to mitigate the interference to at least macrocell mobile devices.

Figure 4A:
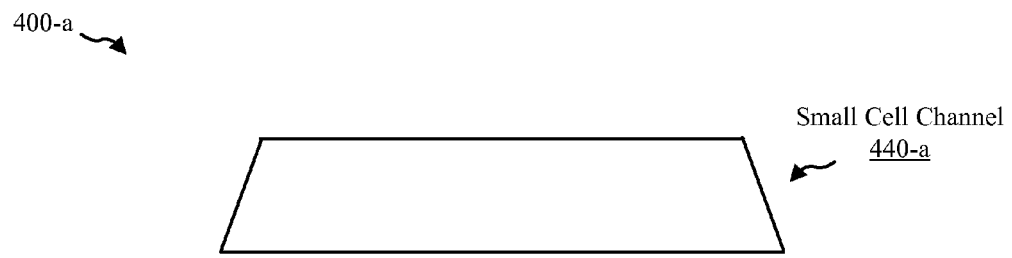
FIG. 4A shows a small cell system in accordance with various embodiments.
Figure 4B:
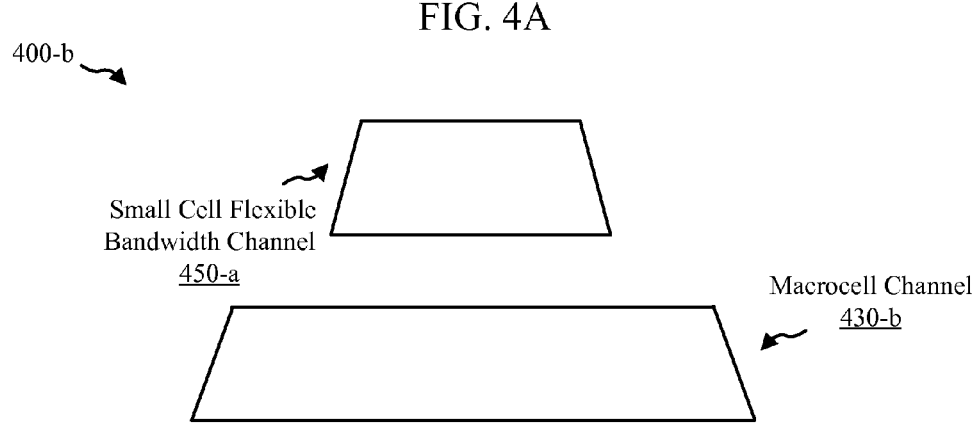
FIG. 4B shows a small cell system in accordance with various embodiments.
Figure 4C:
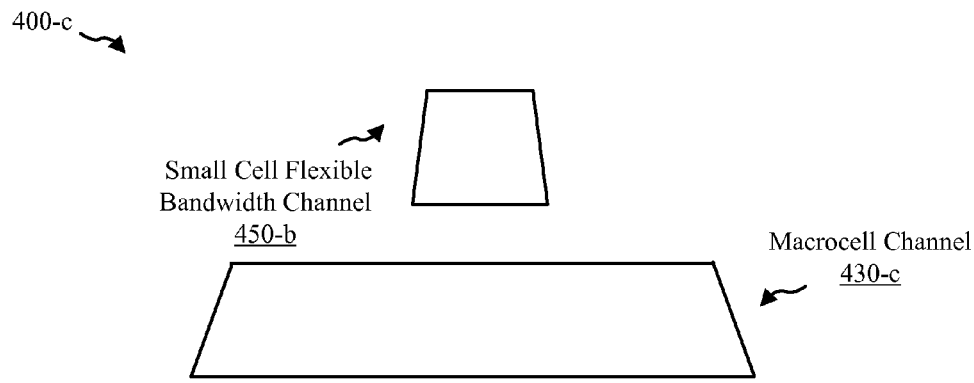
FIG. 4C shows a small cell system in accordance with various embodiments.

Some embodiments include adapting a bandwidth scaling factor N for a small cell that may utilize flexible bandwidth. For example, small cells may be up and running but there may be no users accessing the small cell services or merely a few users (e.g., 1 or 2 users) who may not need the N=1 small cell for their traffic flows. Generally, a small cell is a N=1 system and completely overlaps with the adjoining macrocell(s). Some embodiments utilize an adaptive N for small cells. The adaptive N value may be based on the number of users to be supported and/or their traffic demands. The adaptive N value may be utilized to control the extent of overlap the macrocell has with the small cell and thereby the interference to macrocell mobile devices. In general, a small cell with N=1 may have 100% overlap with macrocells as it is completely in-band and not in available spectrum chunks. FIG. 4A shows an example of a system 400-a where a small cell channel 440-a may coincide with a macrocell channel 430-a. System 400-a may be implemented utilizing systems such as system 100 of FIG. 1, systems 200 of FIG. 2, system 300 of FIG. 3, system 1300 of FIG. 13, and/or system 1500 of FIG. 15. A macrocell may have 100% overlap with N=1 small cell, 50% overlap with an N=2 small cell, 25% overlap with a N=4 small cell and so on. In some situations, the small cell can be deployed to have partial overlap with the macrocell. For example, FIG. 4B and FIG. 4C show examples of systems 400-b and 400-c, respectively, where small cell flexible bandwidth channels 450-a and 450-b overlap macrocell channels 430-b and 430-c, respectively, where the overlap is less than 100 percent. System 400-b and/or 400-c may be implemented utilizing systems such as system 100 of FIG. 1, systems 200 of FIG. 2, system 300 of FIG. 3, system 1300 of FIG. 13, and/or system 1500 of FIG. 15. In these examples, the small cell flexible bandwidth channel 450-b overlaps the macrocell channel 430-c by less than the small cell flexible bandwidth channel 450-a overlaps the macrocell channel 430-b.

Merely by way of example, when there are no users on the small cell, the small cell could switch to N=4 (or 8) for 1x/DO and/or N=8 (or 16) for UMTS. More generally, a small cell that may utilize flexible bandwidth may decrease its bandwidth; transitioning from system 400-b to 400-c of FIG. 4B and FIG. 4C may show such an example. In some cases, adapting the bandwidth scaling factor from N=1 to N>1 may create a beacon of the small cell. The small cell may support services with bare minimum QoS (as it is the small cell signal itself). A small cell may switch to a lower N (i.e., more BW all the way down to N=1, or even less than 1 in some cases, if it needs to support more traffic or meet QoS requirements of small cell mobiles). The small cell may also change channel number when changing its bandwidth to facilitate reducing interference. Adapting the bandwidth scaling factor N for a small cell may reduce the co-channel interference as seen by nearby macrocell mobiles. For example, a macrocell mobile may go from seeing interference in the entire channel, while the macrocell mobile may see interference in a portion of the channel after the small cell adapts its bandwidth scaling factor N.

Some embodiments include creating a beacon-like state for a flexible bandwidth small cell. For example, when a small cell reduces its bandwidth (N>1), it could utilize the same power spectrum density (PSD) as that of N=1 small cell. In that case, the small cell may transmit power for N>1 state that may be less than N=1 state. The Link budget may stay unchanged and the small cell coverage may be unaffected. However, a maximum achievable data rate may be scaled down by a factor of N and delay may be scaled up by a factor of N. In some cases, the flexible bandwidth small cell could have the same transmit power in N>1 state as in N=1 state, though this could create significant interference to farther away macrocell mobiles.

However, in the beacon-like state, the small cell can have higher transmit power than dictated by the same PSD (but may be not as high as the same transmit power as N=1). This beacon-like state may facilitate small cell discovery because the small cell may be detected from an even longer range. Even in the high N state, flexible bandwidth small cells could offer similar data rates to the small cell mobile device as it may be getting on the macrocell or if needed, the flexible bandwidth small cell could expand and go to lower N states based on the QoS requirements of the mobile(s). This may create more interference (than for the same PSD) but the interference may be over a smaller portion of the macrocell frequency channel with which the small cell has overlap. In certain cases, for N>1 and higher PSD than N=1 for example, the interference may be less than using the same PSD at N=1.

Figure 5:
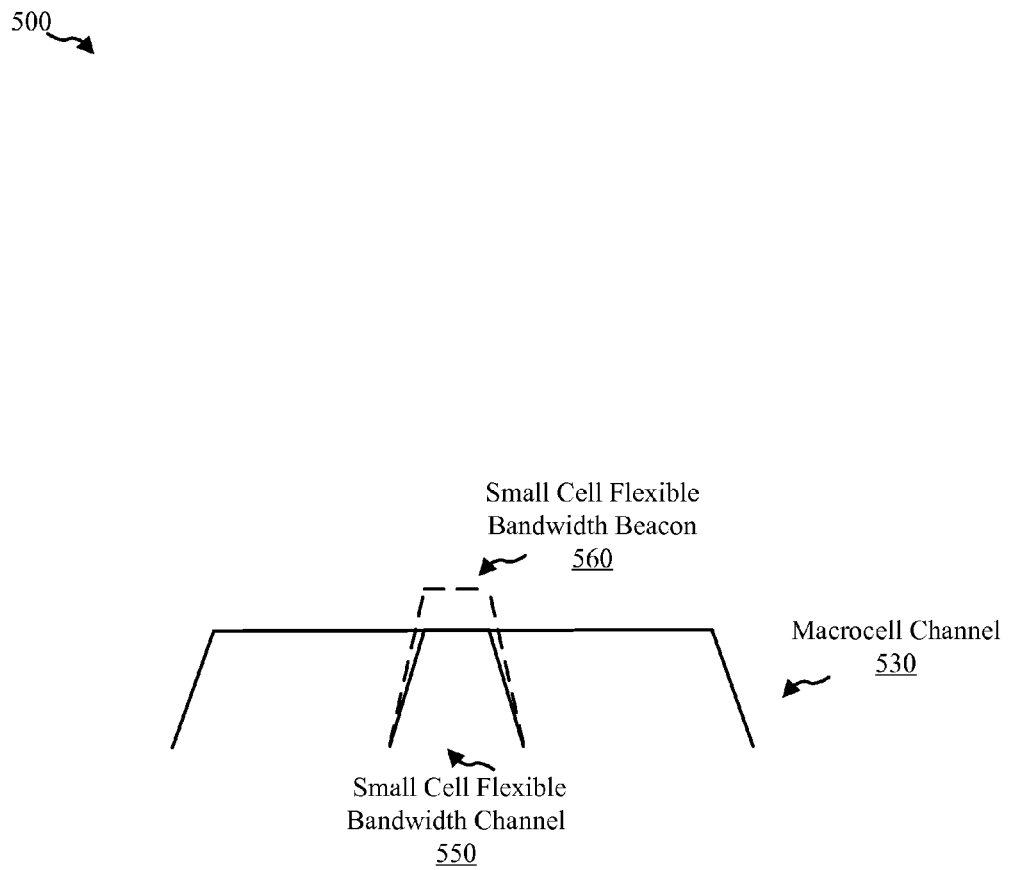
FIG. 5 shows a small cell system in accordance with various embodiments.

FIG. 5 shows an example of a system 500 that may include creating a beacon-like small cell with an increased PSD for a flexible bandwidth channel 560. System 500 also shows a normal macrocell channel 530 and a small cell flexible bandwidth channel 550 that may not be utilizing an increased PSD. System 500 may be implemented utilizing systems such as system 100 of FIG. 1, systems 200 of FIG. 2, system 300 of FIG. 3, system 1300 of FIG. 13, and/or system 1500 of FIG. 15. Generating a beacon-like state for the small cell over the flexible bandwidth carrier may involve altering a transmit power of the small cell over the flexible bandwidth carrier. A beacon-like state may involve generating a beacon carrier. In general, the transmit power may be less than the transmit power that a small cell would utilize for a normal bandwidth channel. The flexible bandwidth beacon-like small cell's coverage range may be greater than a normal bandwidth small cell due to a higher PSD and thereby the small cell might be detected by macrocell UEs from a greater distance. In some cases, a small cell has both a beacon carrier and another carrier, which may be a flexible bandwith carrier or normal bandwidth carrier. In some embodiments, a mobile device moves to the beacon carrier of the small cell and searches for other small cell carriers (e.g., flexible bandwidth carriers). In some embodiments, a small cell may transition its beacon carrier to a flexible bandwith carrier, or even normal bandwidth carrier.

Some embodiments may provide assistance with active hand-in due to more available PN offsets in the flexible bandwidth domain. Utilizing scaling associated with flexible bandwidth for small cells may result in needing lower separation in PN offset for flexible bandwidth small cells. For example, a PN offset separation in dilated chips between the small cell and another flexible bandwidth small cell may be decreased compared to a PN offset separation for a normal bandwidth carrier based on the bandwidth scaling factor. In general, for a bandwidth scaling factor N small cell, there may be N times more available PN offsets. The increase in usable PN offset space for flexible bandwidth small cells allows lower chances of the same PN offset being used by neighboring small cells and helps mitigate the PN offset confusion problem. This may result in unique determination of target small cell for macro to small cell hand-in scenarios.

For example, in a CDMA system, pilots generally use the same PN sequence and they may differ in the offsets of the PN sequence used. A 64-chip separation is generally recommended between pilot PN offsets as it may represent a minimum multi-path separation distance of 15,625 m and/or distance (e.g., speed of light). The number of available pilot PN offsets in a CDMA system is generally inversely proportional to the pilot PN sequence increment (e.g., there are 512 available PN offsets with 64-chip separation). Some deployments use 256-chip separation and this generally gives 128 possible PN offsets. While macrocells generally have unique PN offsets, only a small number of these PN offsets are generally allocated to small cells and reused amongst the hundreds of small cells per macro sector. Thus unlike macrocells, small cells are generally not uniquely identified by their PN offsets. This may lead to active hand-in challenges.

Flexible bandwidth systems may be utilized to address this issue. For example, flexible bandwidth small cells can afford to have lower PN offset separation in dilated chips or increments than compared to N=1 system. As a result, for flexible bandwidth small cells utilizing a bandwidth scaling factor N, there may be N times more available PN offsets. Merely by way of example, consider a flexible bandwidth small cell using a chip rate of 1.2288 McpDs (Mega chips per Dilated seconds), 32,768 chips may cycle every 26.67 Dms. While a 64-chip separation may represent a minimum multi-path separation distance of 15,625 m, in a flexible bandwidth system, it may represent 15,625*Nm multipath separation distance. Thus, flexible bandwidth small cells can afford to have lower PN offset separation in dilated chips or increments than compared to N=1 system.

In a deployment with flexible bandwidth macrocells and flexible bandwidth small cells, these tools and techniques may be utilized to provide unique PN offsets for flexible bandwidth small cells in a given geographical area (these PN offsets may also be reused beyond that area). In a deployment with normal bandwidth macrocells and flexible bandwidth small cells, some additional PN offsets may still be used by the flexible bandwidth small cells. These additional PN offsets may help the active hand-in problem.

Figure 6A:
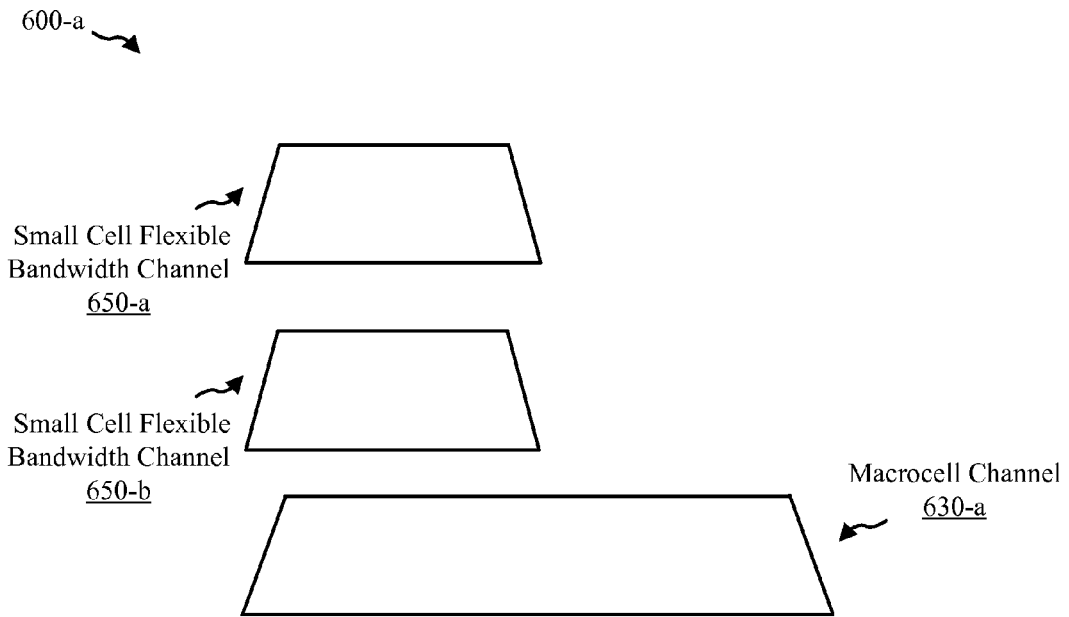
FIG. 6A shows a small cell system in accordance with various embodiments.
Figure 6B:
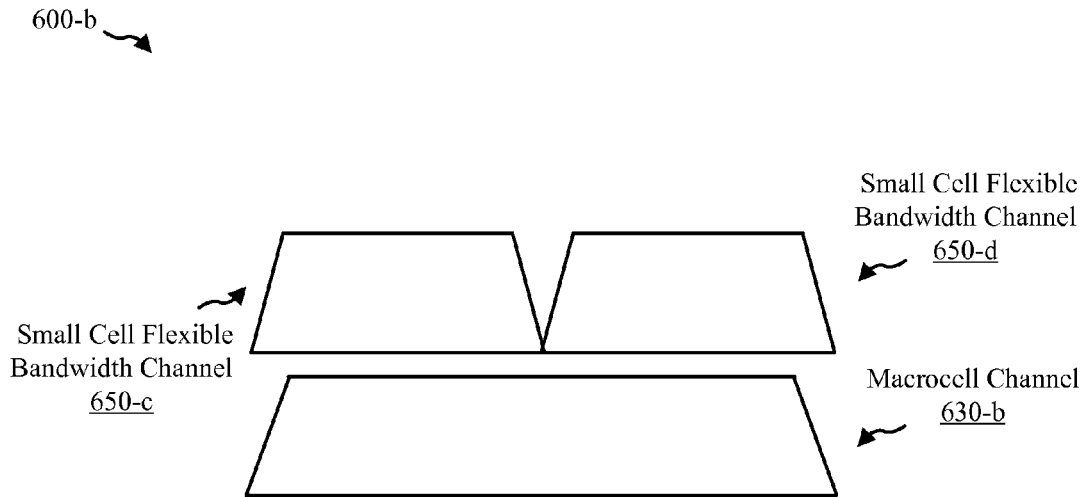
FIG. 6B shows a small cell system in accordance with various embodiments.

Some embodiments may also utilize self configuration for small cells utilizing flexible bandwidth channels. It may be desirable for neighboring small cells to not operate in the same sub-band when they are operating in N>1 modes. For example, one small cell may determine a portion of a normal bandwidth channel of a macrocell for the small cell to operate within utilizing the flexible bandwidth carrier; FIG. 6A shows an example of a system 600-*a* where at least one small cell may utilize a left sub-band, or flexible bandwidth channel 650-*a*/650-*b*, with respect to the normal bandwidth channel 630-*a* of the macrocell. System 600-*a* may be implemented utilizing systems such as system 100 of FIG. 1, systems 200 of FIG. 2, system 300 of FIG. 3, system 1300 of FIG. 13, and/or system 1500 of FIG. 15. Multiple small cells may coordinate which portions of the normal bandwidth channel 630-*a* that they utilize, such as through transmitting information regarding the portion of the normal bandwidth channel for a first small cell to operate within. As a result, a second small cell may receive this information from the first small cell regarding the portion of the normal channel 630-*a* in which the first small cell has determined to operate within utilizing a flexible bandwidth carrier. FIG. 6B shows an example of a system 600-*b* where small cell flexible bandwidth channel 650-*c* may coordinate with small cell flexible bandwidth channel 650-*b* with respect to macrocell channel 630-*b*. The second small cell may determine another portion of the normal channel, such as flexible bandwidth channel 650-*d*, to operate within based on the received information utilizing the flexible bandwidth carrier. The second small cell may also transmit information regarding the portion of the normal channel in which the second small cell has determined to operate within utilizing a flexible bandwidth carrier. Multiple small cells may coordinate with each other regarding the portions of the normal channel in which they operate utilizing flexible bandwidth carriers.

In some embodiments, coordination between neighboring small cells may utilize network listening module (NLM). For example, one small cell can choose to operate in the left portion of the channel during N>1 mode operation and broadcast this information; this is shown in FIG. 6B with small cell flexible bandwidth channel 650-*c*. Another small cell may listen to this broadcast (via its NLM) and decide to operate in the right portion of the channel during its N>1 mode operation, as shown with small cell flexible bandwidth channel 650-*d*. In some cases, the interference from these small cells to macrocell mobile devices may be whitened. This approach may be generalized. For example, there may be more permutation for an N=4 system. Some embodiments may have a mixed system where there is 2 N=4 and 1 N=2 system, etc.]

Figure 7A:
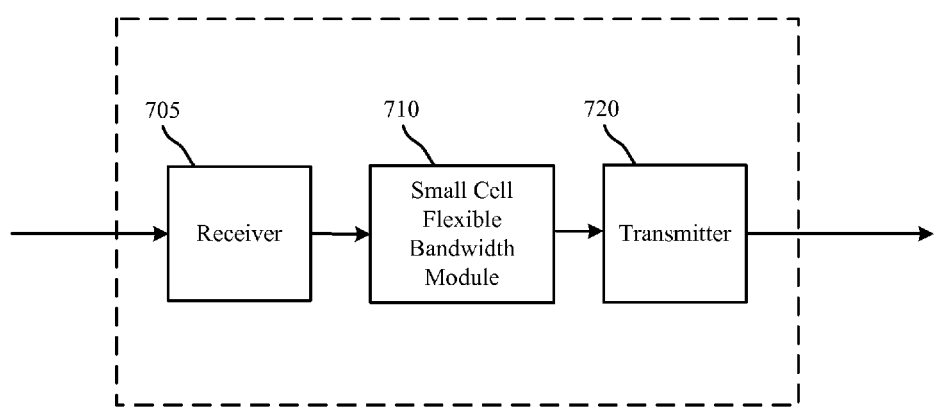
FIG. 7A shows a block diagram of a device in accordance with various embodiments.

Turning next to FIG. 7A, a block diagram illustrates a device 700-*a* that includes small cell flexible bandwidth functionality in accordance with various embodiments. The device 700-*a* may be an example of aspects of the small cells 125 of FIG. 1, FIG. 2, FIG. 3, FIG. 13, and/or FIG. 15. The device 700 may be an example of aspects of the mobile devices 115 of FIG. 1, FIG. 2, FIG. 3, FIG. 13, FIG. 14, and/or FIG. 15. The device 700-*a* may also be a processor. The device 700 may include a receiver 705, a small cell flexible bandwidth module 710, and/or a transmitter 720. Each of these components may be in communication with each other.

These components of the device 700-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 705 may receive information such as packet, data, and/or signaling information regarding what device 700-*a* has received or transmitted. The received information may be utilized by the small cell flexible bandwidth module 710 for a variety of purposes.

The small cell flexible bandwidth module 710 may be configured for implementing flexible bandwidth for a small cell. For example, the small cell flexible bandwidth module 710 may be configured to generate a flexible bandwidth carrier for the small cell. In some embodiments, the small cell flexible bandwidth module 710 may utilize a first bandwidth scaling factor to generate the flexible bandwidth carrier. In some embodiments, the small cell flexible bandwidth module 710 determines the first bandwidth scaling factor for the small cell.

In some embodiments, the small cell flexible bandwidth module 710 determines additional bandwidth scaling factors, such as second bandwidth scaling factor for the small cell. The small cell flexible bandwidth module 710 may adapt the flexible bandwidth carrier for the small cell from utilizing the first bandwidth scaling factor to utilizing another bandwidth scaling factor, such as the second bandwidth scaling factor. In some embodiments, adapting the flexible bandwidth carrier for the small cell from utilizing the first bandwidth scaling factor to utilizing the second bandwidth scaling factor increases a bandwidth of the flexible bandwidth carrier to support at least a traffic increase or a quality-of-service requirement.

In some embodiments, the small cell flexible bandwidth module 710 determines at least a number of users to be support by the small cell or a traffic demand for one or more users of the small cell. The small cell flexible bandwidth module 710 may utilize at least the determined number of users or the determined traffic demand to determine the first bandwidth scaling factor. The small cell flexible bandwidth module 710 may change a channel number of the small cell when utilizing the flexible bandwidth carrier.

The small cell flexible bandwidth module 710 may generate a beacon-like state for the small cell utilizing the flexible bandwidth carrier through altering a transmit power of the small cell utilizing the flexible bandwidth carrier. In some embodiments, the transmit power of the small cell utilizing the flexible bandwidth carrier is less than a transmit power for the small cell utilizing a normal bandwidth carrier. In some embodiments, the power spectrum density of the small cell utilizing the flexible bandwidth carrier is greater than a power spectrum density for the small cell utilizing a normal bandwidth carrier. The small cell flexible bandwidth module 710 may generate the beacon-like state for the small cell to enhance a range of the small cell for small cell detection.

In some embodiments, the small cell flexible bandwidth module 710 is configured to decrease a PN offset separation in dilated chips between the small cell and another small cell compared to a PN offset separation for a normal bandwidth carrier based on the bandwidth scaling factor. Decreasing the PN offset separation in dilated chips may increase a number of unique PN offsets associated with the small cell and at least one other small cell. Increasing the number of unique PN offsets may result in unique small cell identification that facilitates macrocell to small cell hand-in.

The small cell flexible bandwidth module 710 may be configured to determine a portion of a normal bandwidth channel of a macrocell for the small cell to operate within utilizing the flexible bandwidth carrier. The small cell flexible bandwidth module 710 and/or the transmitter 720 may be configured to transmit information regarding the portion of the normal bandwidth channel for the small cell to operate within. In some embodiments, the small cell flexible bandwidth module 710 and/or the receiver 705 are configured to receive information from another small cell regarding a portion of a normal channel in which the other small cell has determined to operate within utilizing another flexible bandwidth carrier. The small cell flexible bandwidth module 710 may determine another portion of the normal channel to operate within based on the received information utilizing the flexible bandwidth carrier. The information from the other small cell regarding the portion of the normal channel in which the other small cell has determined to operate within utilizing another flexible bandwidth carrier may utilize the small cell's network-utilizing mode.

In some embodiments, the small cell flexible bandwidth module 710 may be configured to identify a first bandwidth scaling factor of a first flexible bandwidth carrier. The small cell flexible bandwidth module 710 may be configured to determine a second bandwidth scaling factor. The small cell flexible bandwidth module 710 may be configured to adapt a bandwidth of the first flexible bandwidth carrier from utilizing the first bandwidth scaling factor to utilizing the second bandwidth scaling factor.

In some embodiments, the small cell flexible bandwidth module 710 may be configured to adapt the bandwidth of the first flexible bandwidth from utilizing the first bandwidth scaling factor to utilizing the second bandwidth scaling factor, which may include increasing the bandwidth of the first flexible bandwidth carrier. Adapting the bandwidth of the first flexible bandwidth from utilizing the first bandwidth scaling factor to utilizing the second bandwidth scaling factor may include decreasing the bandwidth of the first flexible bandwidth carrier. In some embodiments, small cell flexible bandwidth module 710 may utilize different flexible bandwidths for uplink and downlink. In one embodiment, one of uplink or downlink can be full bandwidth carrier while the other is flexible bandwidth carrier with bandwidth scaling factor greater than 1. If the traffic is more in downlink, then downlink could be full bandwidth and vice versa. For example, flexible bandwidth small cells may utilize flexible bandwidths for downlink and uplink to conserve energy when the quality of service requirements of small cell mobiles can be met with flexible bandwidth carriers.

In some embodiments, the device 700 may be configured utilizing one or more of its modules to hand over a mobile device camped on the first flexible bandwidth carrier to another bandwidth carrier before decreasing the bandwidth of the first flexible bandwidth carrier. The mobile device may be handed back to the first flexible bandwidth carrier after decreasing the bandwidth of the first flexible bandwidth carrier. Similar actions may be performed where the bandwidth of the first flexible bandwidth carrier is increased.

The small cell flexible bandwidth module 710 may be configured to adapt a bandwidth of a first downlink flexible bandwidth carrier from utilizing the first bandwidth scaling factor to utilizing a third bandwidth scaling factor different from the second bandwidth scaling factor. The first flexible bandwidth carrier may include a first uplink-flexible bandwidth carrier, and the second bandwidth scaling factor and third bandwidth scaling factor are determined based on one or more traffic patterns for at least the first uplink-flexible bandwidth carrier or the first downlink-flexible bandwidth carrier. Some embodiments include adapting a bandwidth of a second downlink-flexible bandwidth carrier from utilizing the first bandwidth scaling factor to utilizing a fourth bandwidth scaling factor and/or adapting a bandwidth of a second uplink-flexible bandwidth carrier from utilizing the first bandwidth scaling factor to utilizing a fifth bandwidth scaling factor. Some embodiments include coupling at least the first uplink-flexible bandwidth carrier with the second downlink-flexible bandwidth carrier or the second uplink-flexible bandwidth carrier with the first downlink-flexible bandwidth carrier. Some embodiments include assigning at least one user to at least the first uplink-flexible bandwidth carrier, the second uplink-flexible bandwidth carrier, the first downlink-flexible bandwidth carrier, or the second downlink-flexible bandwidth carrier based on at least a requirement or a need of the at least one user. Some embodiments include changing at least a first center frequency for the first uplink-flexible bandwidth carrier or a second center frequency for the first downlink-flexible bandwidth carrier.

The transmitter module 720 may be configured to transmit the second bandwidth scaling factor to a mobile device- and/ or to transmit at least a time or a timing period to the mobile device regarding when the bandwidth of the first flexible bandwidth carrier will be adapted from utilizing the first bandwidth scaling factor to utilizing the second bandwidth scaling factor. Transmitting data to the mobile device may be eschewed, avoided, and/or not scheduled during the timing period.

In some embodiments, increasing the bandwidth of the first flexible bandwidth carrier increases a capacity of the first flexible bandwidth carrier. In some embodiments, decreasing the bandwidth of the first flexible bandwidth carrier comprises at least reducing interference with one or more cells, reducing in-band interference, or conserving energy.

Figure 7B:
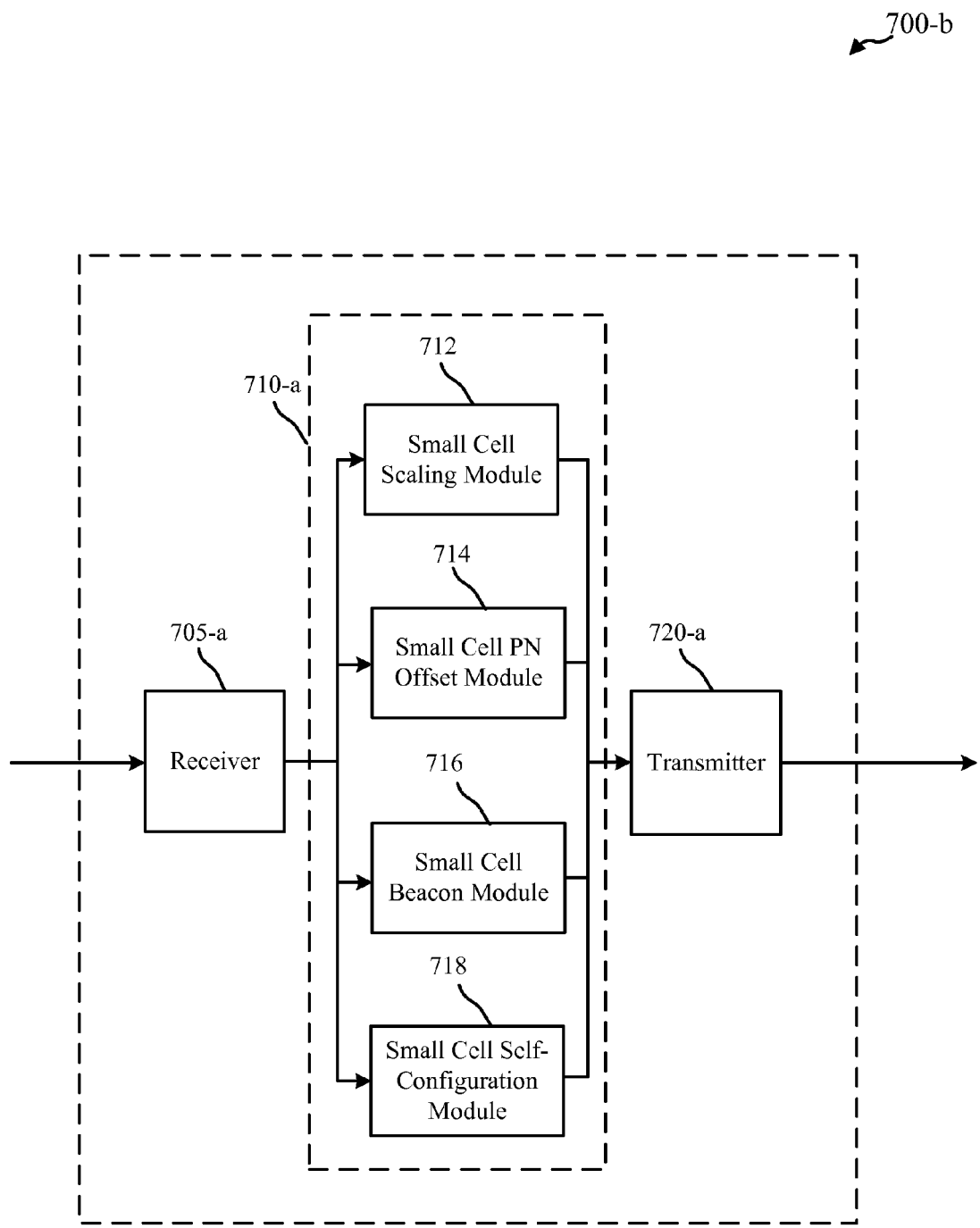
FIG. 7B shows a block diagram of a device in accordance with various embodiments.

Turning next to FIG. 7B, a block diagram illustrates a device 700-B that includes small cell flexible bandwidth functionality in accordance with various embodiments. The device 700-b may be an example of aspects of the small cells 125 of FIG. 1, FIG. 2, FIG. 3, FIG. 13, and/or FIG. 15. The device 700 may be an example of aspects of the mobile devices 115 of FIG. 1, FIG. 2, FIG. 3, FIG. 13, FIG. 14, and/or FIG. 15. The device 700-a may also be a processor. The device 700 may also be a processor. The device 700-b may include a receiver 705-a, a small cell scaling module 712, a small cell PN offset module 714, a small cell beacon module 716, a small cell self-configuration module 718, and/or a transmitter 720-a. Each of these components may be in communication with each other. The small cell scaling module 712, the small cell PN offset module 714, the small cell beacon module 716, and/or the small cell self-configuration module 718 may be part of a small cell flexible bandwidth module 710-a, which may be an example of the small cell flexible bandwidth module 710 as described for device 700-a of FIG. 7A. Device 700-b may be an example of device 700-a of FIG. 7A.

These components of the device 700-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 705 may receive information such as packet, data, and/or signaling information regarding what device 700-b has received or transmitted. The received information may be utilized by the small cell scaling module 712, the small cell PN offset module 714, the small cell beacon module 716, the small cell self-configuration module 718, and/or the small cell flexible bandwidth module 710-a for a variety of purposes.

The small cell flexible bandwidth module 710-a may be configured for implementing flexible bandwidth for a small cell. For example, the small cell scaling module 712 may be configured to generate a flexible bandwidth carrier for the small cell. In some embodiments, the small cell scaling module 712 may utilize a first bandwidth scaling factor to generate the flexible bandwidth carrier. In some embodiments, the small cell scaling module 712 determines the first bandwidth scaling factor for the small cell.

In some embodiments, the small cell scaling module 712 determines additional bandwidth scaling factors, such as the second bandwidth scaling factor for the small cell. The small cell scaling module 712 may adapt the flexible bandwidth carrier for the small cell from utilizing the first bandwidth scaling factor to utilizing another bandwidth scaling factor, such as the second bandwidth scaling factor. In some embodiments, adapting the flexible bandwidth carrier for the small cell from utilizing the first bandwidth scaling factor to utilizing the second bandwidth scaling factor increases a bandwidth of the flexible bandwidth carrier to support at least a traffic increase or a quality-of-service requirement.

In some embodiments, the small cell flexible bandwidth module 710 determines at least a number of users to be support by the small cell or a traffic demand for one or more users of the small cell. The small cell flexible bandwidth module 710 may utilize at least the determined number of users or the determined traffic demand to determine the first bandwidth scaling factor. The small cell flexible bandwidth module 710 may change a channel number of the small cell when utilizing the flexible bandwidth carrier.

The small cell beacon module 716 may generate a beacon-like state for the small cell utilizing the flexible bandwidth carrier through altering a transmit power of the small cell utilizing the flexible bandwidth carrier. In some embodiments, the transmit power of the small cell utilizing the flexible bandwidth carrier is less than a transmit power for the small cell utilizing a normal bandwidth carrier. This may result in energy savings. In some embodiments, the power spectrum density of the small cell utilizing the flexible bandwidth carrier is greater than a power spectrum density for the small cell utilizing a normal bandwidth carrier. The small cell beacon module 716 may generate the beacon-like state for the small cell to enhance a range of the small cell for small cell detection.

In some embodiments, the small cell PN offset module 714 is configured to decrease a PN offset separation in dilated chips between the small cell and another small cell compared to a PN offset separation for a normal bandwidth carrier based on the bandwidth scaling factor. Decreasing the PN offset separation in dilated chips may increase a number of unique PN offsets associated with the small cell and at least one other small cell. Increasing the number of unique PN offsets may result in unique small cell identification that facilitates macrocell to small cell hand-in.

The small cell PN offset module 714 may be configured to determine a portion of a normal bandwidth channel of a macrocell for the small cell to operate within utilizing the flexible bandwidth carrier. The small cell PN offset module 714 and/or the transmitter 720 may be configured to transmit information regarding the portion of the normal bandwidth channel for the small cell to operate within. In some embodiments, the small cell PN offset module 714 and/or the receiver 705 are configured to receive information from another small cell regarding a portion of a normal channel in which the other small cell has determined to operate within utilizing another flexible bandwidth carrier. The small cell PN offset module 714 may determine another portion of the normal channel to operate within based on the received information utilizing the flexible bandwidth carrier. The information from the other small cell regarding the portion of the normal channel in which the other small cell has determined to operate within utilizing another flexible bandwidth carrier may utilize the small cell's network utilizing mode.

Some embodiments provide for variable bandwidth scaling factors for small cell deployments. Variable bandwidth scaling factors may include dynamically adjusting one or more bandwidth scaling factors for a flexible bandwidth system. Variable bandwidth scaling factors may be utilized for a variety of purposes including, but not limited to, increasing capacity, interference mitigation and avoidance, uniquely identifying cells, cell disambiguation, and/or energy savings. Some embodiments provide for variable bandwidth scaling factors for uplink and/or downlink applications.

Figure 8:
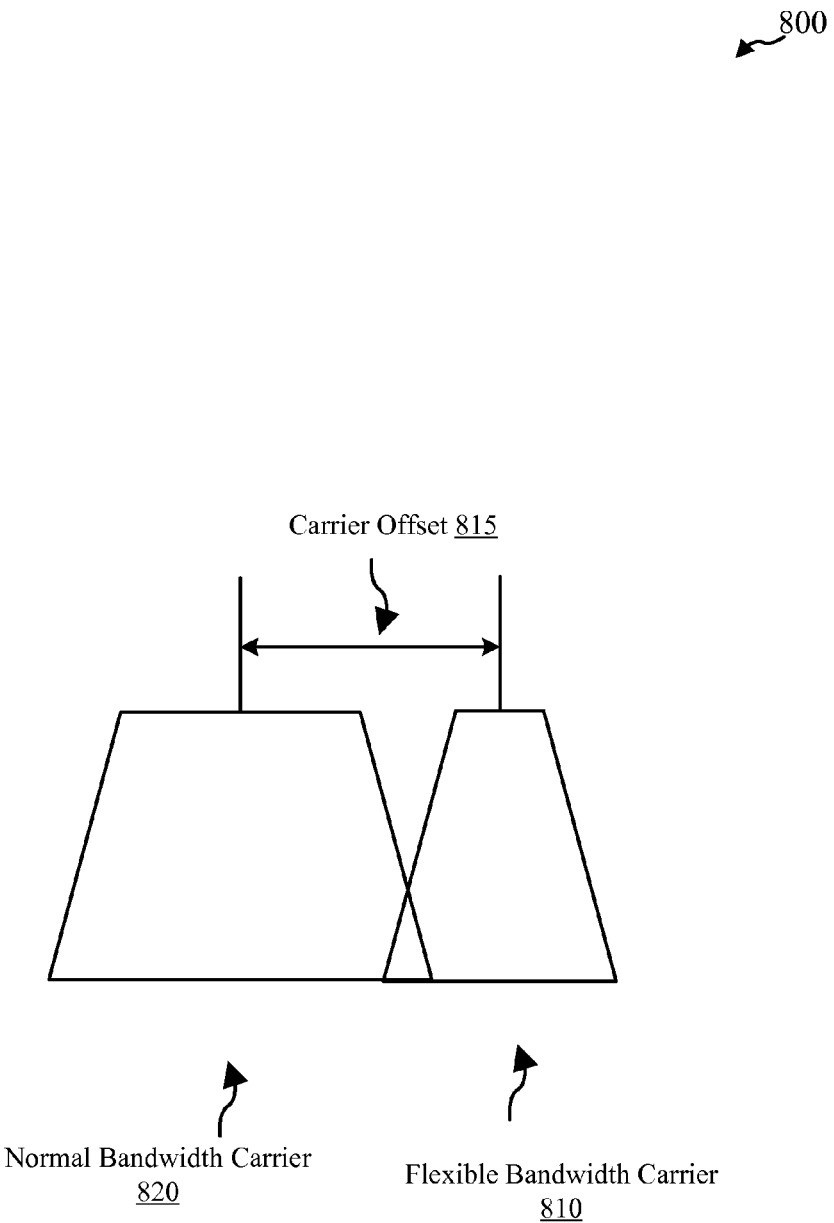
FIG. 8 shows a carrier system in accordance with various embodiments.

As discussed above in more detail, a bandwidth scaling factor, N, may represent a flexible bandwidth reduction factor such that N=1 represents a regular cellular carrier and N>1 (or N<1 in some cases, which may be referred to as an flexible bandwidth expansion factor) may represent the flexible bandwidth signal. For a small cell deployment, the normal and flexible bandwidth carriers may be separated by carrier offset (CO). For example, FIG. 8 shows a carrier system 800 that includes a normal bandwidth carrier 820 separated from a flexible bandwidth carrier 810 by carrier offset 815. As shown in FIG. 2, the amount of overlap between a normal bandwidth carrier (or other flexible bandwidth carriers) and a flexible bandwidth carrier and/or the width of each bandwidth carrier may vary, thus resulting in different carrier offsets. In some deployments, a neighboring cell to a flexible bandwidth carrier may also be another flexible bandwidth carrier.

Embodiments are provided for adapting the bandwidth of a flexible bandwidth carrier. Some embodiments include dynamically adapting the bandwidth of a flexible bandwidth carrier by changing the bandwidth scaling factor of the flexible bandwidth signal based on information such as traffic patterns, interference measurements, etc.

Figure 9A:
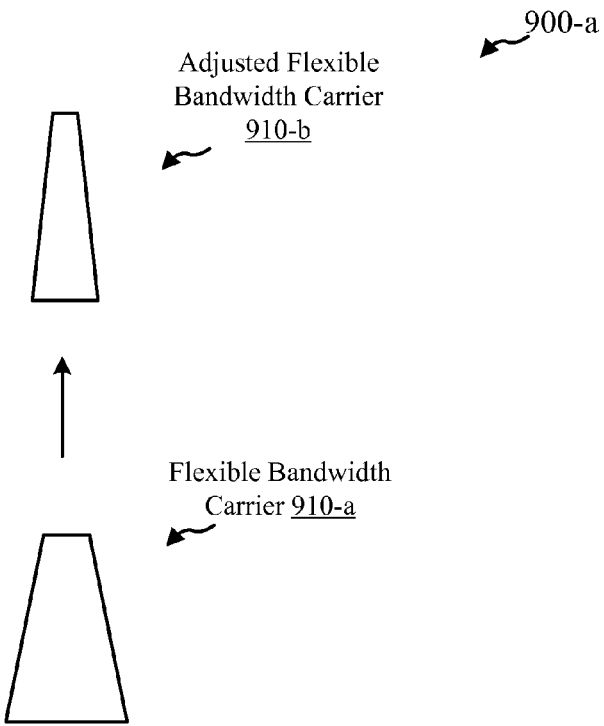
FIG. 9A shows a bandwidth carrier diagram in accordance with various embodiments.
Figure 9B:
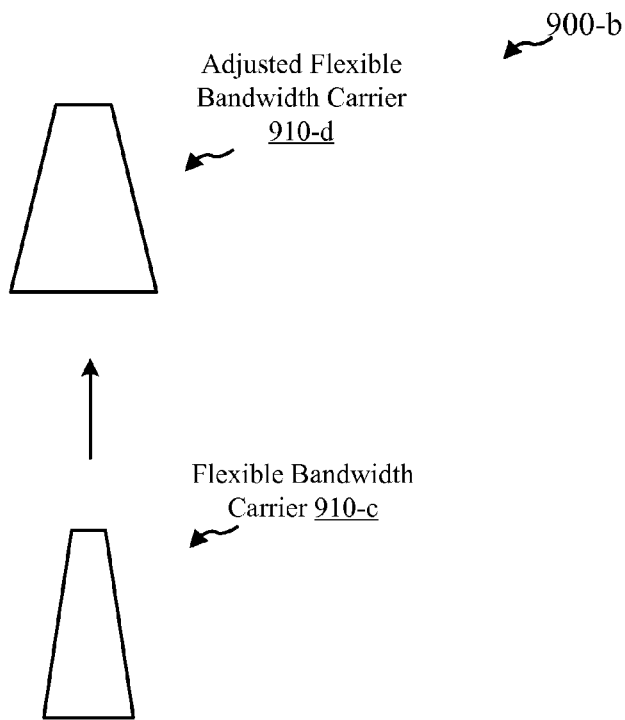
FIG. 9B shows a bandwidth carrier diagram in accordance with various embodiments.

The bandwidth of a small cell flexible bandwidth signal may be adjusted for several reasons. In some situations, the bandwidth of a flexible bandwidth signal may be decreased. FIG. 9A, for example, shows a bandwidth carrier diagram 900-$a$ where a flexible bandwidth carrier 910-$a$ may be adjusted such that the bandwidth decreases, resulting in an adjusted flexible bandwidth carrier 910-$b$. In this example, the flexible bandwidth carrier 910-$a$ may have a bandwidth scaling factor N associated with it, while the adjusted bandwidth carrier 910-$b$ may have a bandwidth scaling factor M associated with it, where M<N. Decreasing the bandwidth of a flexible bandwidth signal may reduce the interference to other cells. For example, if there are indications that the flexible bandwidth carrier may be causing interference to neighboring cells, the bandwidth may be decreased to reduce the interference to other carriers; in some situations, the interference to the neighboring cells may have been significant. In scenarios where the flexible bandwidth signal might be overlapping a normal bandwidth carrier, the bandwidth can be reduced to reduce the overlap region. Decreasing the bandwidth of a flexible bandwidth signal may reduce in-band interference. For example, if a flexible bandwidth cell may be experiencing interference from a neighboring cell (which may be significant in some cases), it may reduce its own bandwidth in order to reduce the interference and this helps to maintain the quality of service (QoS) experienced by its own mobile devices or UEs. Decreasing the bandwidth of a flexible bandwidth signal may conserve energy. For example, if the capacity on certain carriers may not be required, then the bandwidth of such carriers may be reduced and/or carriers may be powered off to reduce the power consumption on those carriers. In some embodiments, the bandwidth of a flexible bandwidth signal may be adjusted to increase the bandwidth of a flexible bandwidth signal to increase capacity on the carrier. Based on historical data or other information, the small cell might be able to predict hours when there would be an increase in traffic on the network so that a bandwidth increase can be scheduled to accommodate such traffic for example. Once the traffic reduces, then the bandwidth of the flexible bandwidth may be reduced again. FIG. 9B, for example, shows a bandwidth carrier diagram 900-$b$ where a flexible bandwidth carrier 910-$c$ may be adjusted such that the bandwidth increases resulting in an adjusted flexible bandwidth carrier 910-$d$. In this example, the flexible bandwidth carrier 910-$c$ may have a bandwidth scaling factor N=P associated with it, while the adjusted bandwidth carrier 910-$d$ may have a bandwidth scaling factor N=Q associated with it, where P<Q. In some cases, a center frequency (e.g., channel number) may also change. The power or PSD may also change.

Merely by way of example, compared to legacy Release 99 systems (without flexible bandwidth carriers) where the bandwidth of the carrier is generally static, flexible bandwidth systems may produce dynamic bandwidth by varying the bandwidth scaling factor N value at a base station. In some cases, the bandwidth scaling factor N may be varied at a mobile device. Compared to LTE-based system (without flexible bandwidth carriers) where subcarriers are generally used to dynamically change the bandwidth, the flexible bandwidth systems may utilize a CDMA-based system with the ability to adjust its transmission bandwidth.

In some embodiments, bandwidth change can be triggered by a variety of different factors. For example, bandwidth changes may be triggered using one or more specific times. Some specific times may be extracted from traffic profiling and utilized to configure low-load periods with associated bandwidth scaling factors. Bandwidth changes may be triggered by one or more offloading requests from neighboring cells. A bandwidth change may be triggered by reception of significant service requests from flexible bandwidth mobile devices that may potentially lead to an overload scenario. A bandwidth change may be triggered by a mobile device's request for higher QoS than is currently supported in the fractional bandwidth carrier.

Changing bandwidth for a flexible bandwidth system may be utilized for interference reduction and/or avoidance. A flexible bandwidth carrier may estimate that its own mobile devices or neighboring mobile devices may be experiencing high interference and then adapt its bandwidth to address the interference problem. Certain triggers may be utilized to facilitate this process. A bandwidth change may be triggered by a significant number of service requests from mobile devices previously in neighboring carriers indicating high interference in those cells, for example. A bandwidth change may be triggered by poor QoS for mobile devices connected to flexible bandwidth carrier (e.g., high BLER) indicating the high interference from neighboring cells, for example. A bandwidth change may be triggered by an interference reduction request from neighboring cells.

Figure 10:
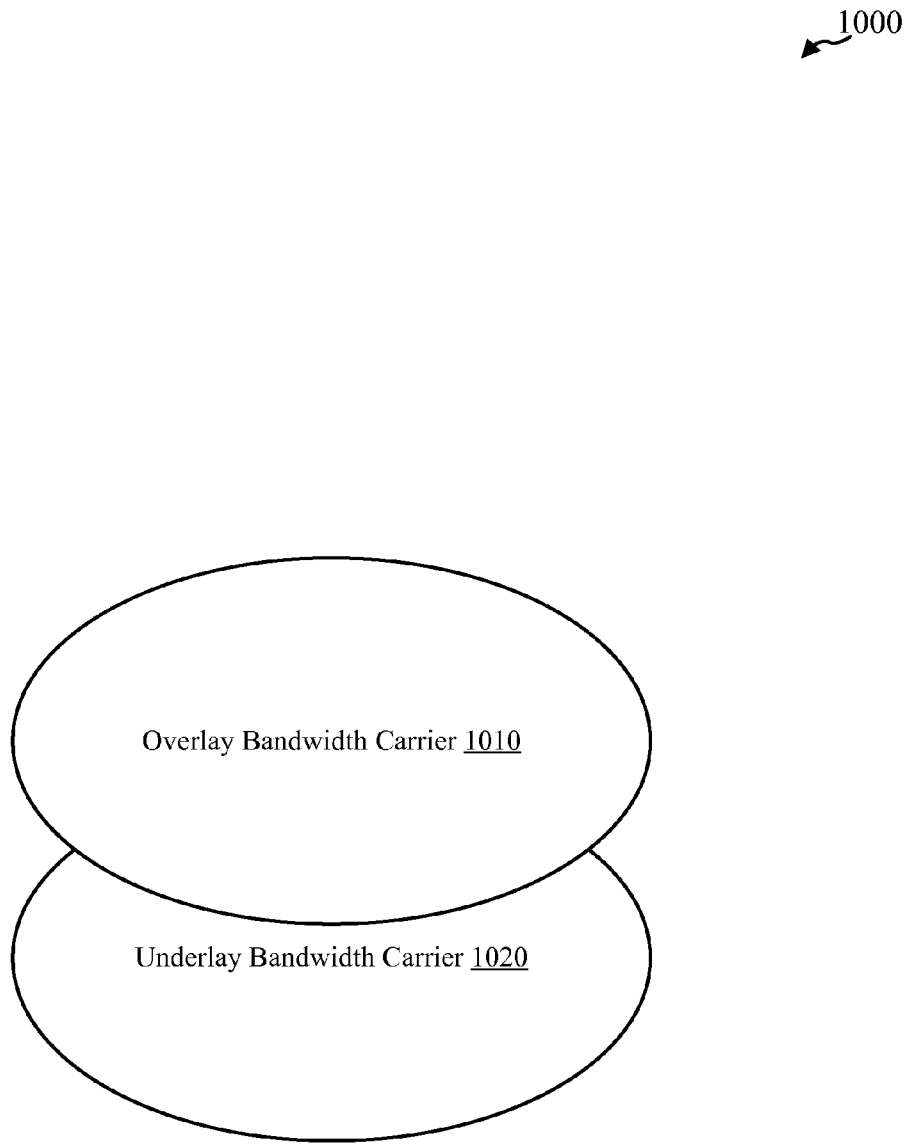
FIG. 10 shows a wireless communications system in accordance with various embodiments.

Changing bandwidth for a small cell flexible bandwidth system may also be utilized for energy savings. For example, some embodiments include an overlay flexible bandwidth carrier that reduces its bandwidth or turns off when traffic is low and turns back on when traffic increases in neighboring cells. In some situations, before a flexible bandwidth carrier reduces its bandwidth or powers off, mobile devices would be moved from the carrier to an underlay bandwidth carrier; the underlay bandwidth carrier may be a flexible or normal bandwidth carrier. The underlay carrier may have a different flexible bandwidth from the overlay. As long as the mobile devices can support the bandwidth on the underlay cells, the overlay cell may be allowed to power off, or vice versa. FIG. 10 shows a wireless communications system diagram 1000 that includes both an overlay bandwidth carrier 1010 and an underlay bandwidth carrier 1020. Typically, the overlay bandwidth carrier 1010 includes a flexible bandwidth carrier. The underlay bandwidth carrier 1020 may be a normal bandwidth carrier or a flexible bandwidth carrier. An underlay bandwidth carrier 1020 may be co-located or non co-located with the overlay bandwidth carrier. In non co-located scenarios, multiple carriers may be required to support the coverage area of the overlay cell. The underlay bandwidth carrier 1020 may send a power on request to the overlay bandwidth carrier 1010. The underlay bandwidth carrier 1020 might, in certain cases, have to increase its bandwidth to accommodate mobile devices from the powered-off or reduced-bandwidth overlay bandwidth carrier 1010.

Figure 11A:
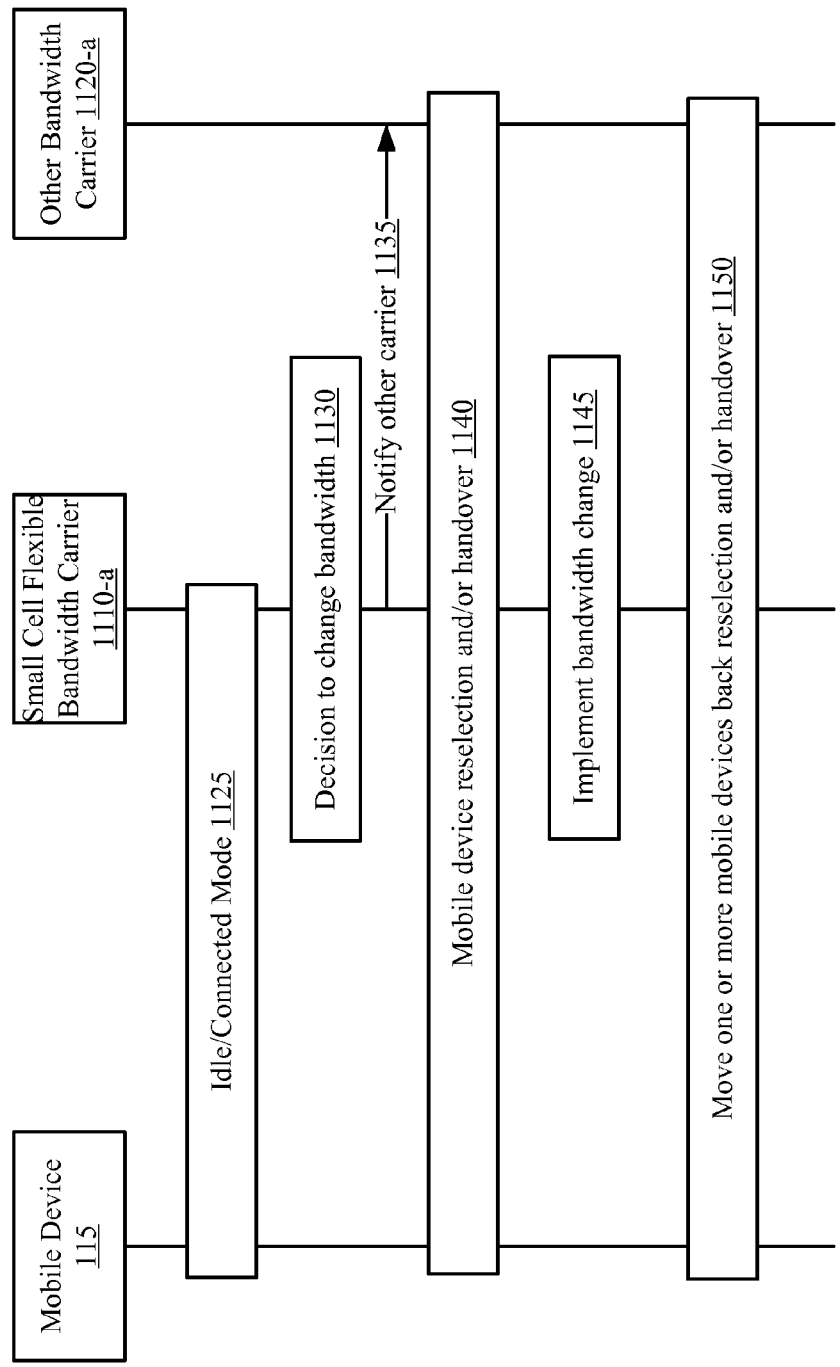
FIG. 11A shows a system communications diagram in accordance with various embodiments.

Turning now to FIG. 11A, a systems communications diagram 1100-a shows one possible procedure for changing bandwidth in accordance with various embodiments. A mobile device 115 may be in an idle or connected mode, for example, with small cell flexible bandwidth carrier 1110-a as shown at block 1125. Small cell flexible bandwidth carrier 1110-a may be associated with a small cell 125 and/or gateway 140 as seen in FIG. 1 and/or FIG. 3, for example. A bandwidth change may be triggered based on a variety of different factors including, but not limited to, capacity, interference mitigation and/or avoidance, and/or network energy savings criteria as discussed herein. Block 1130 reflects that a decision to change bandwidth may be made. While this may be made at a small cell, in some situations, a mobile device, controller, and/or network may make this decision as shown in FIG. 1, for example. Once triggered, one or more aspects of the system, such as a gateway, may coordinate the change in bandwidth or a change in bandwidth scaling factor N. The trigger to change bandwidth may be received as either a message or be based on time in some cases. For example, another bandwidth carrier 1120-a may be notified 1135 by small cell flexible bandwidth carrier 1110-a. The other bandwidth carrier 1120-a may be a normal bandwidth carrier or a flexible bandwidth carrier. The bandwidth scaling factor N that may be utilized to change the bandwidth may be determined. In some cases, this adapted bandwidth scaling factor may be signaled to a small cell if the small cell itself does not determine the adapted bandwidth scaling factor.

Some embodiments can mitigate the impact of bandwidth change on the mobile devices in a variety of ways. For example, broadcast channel (BCCH) modification information may be utilized. As shown in the systems communications diagram 1100-a, one or more other bandwidth carriers may be notified 1135 that a bandwidth change may occur for the flexible bandwidth carrier. In some cases, messages may be broadcast to mobile devices to change bandwidth. A mobile device could update the change when it wakes in some cases. One or more mobile devices 115 may be handed over and/or reselected to one of the other bandwidth carriers as shown in block 1140. The bandwidth change may be implemented as shown in block 1145. The mobile device 115 may be moved back after the change as shown in block 1150. In some cases, system information may be modified to facilitate re-selection to other cells and back to cell after a change.

In some embodiments, the base station may receive a bandwidth change request from a network device, such as gateway 140. The small cell may implement the bandwidth change, as shown in block 1145, and report back to the network once the change has been completed. In some cases, the mobile devices may be moved over to the flexible bandwidth carrier after the bandwidth change as shown in block 1150.

Embodiments may provide more flexibility and granularity than other forms of communications systems because the flexible scale factor may take on numerical values not available to systems that are limited to integral numbers of sub-carriers.

In some embodiments, the small cell flexible bandwidth carrier 1110-a may transmit to mobile device 115 at least a time or a timing period to the mobile device regarding when the bandwidth of the small cell flexible bandwidth carrier 1110-a will be adapted from utilizing one bandwidth scaling factor to utilizing another bandwidth scaling factor. Transmitting data to the mobile device 115 may be eschewed, avoided, and/or not scheduled during the timing period. In this case, the mobile device 115 may not need to be moved over to the other bandwidth carrier 1120-b.

Figure 11B:
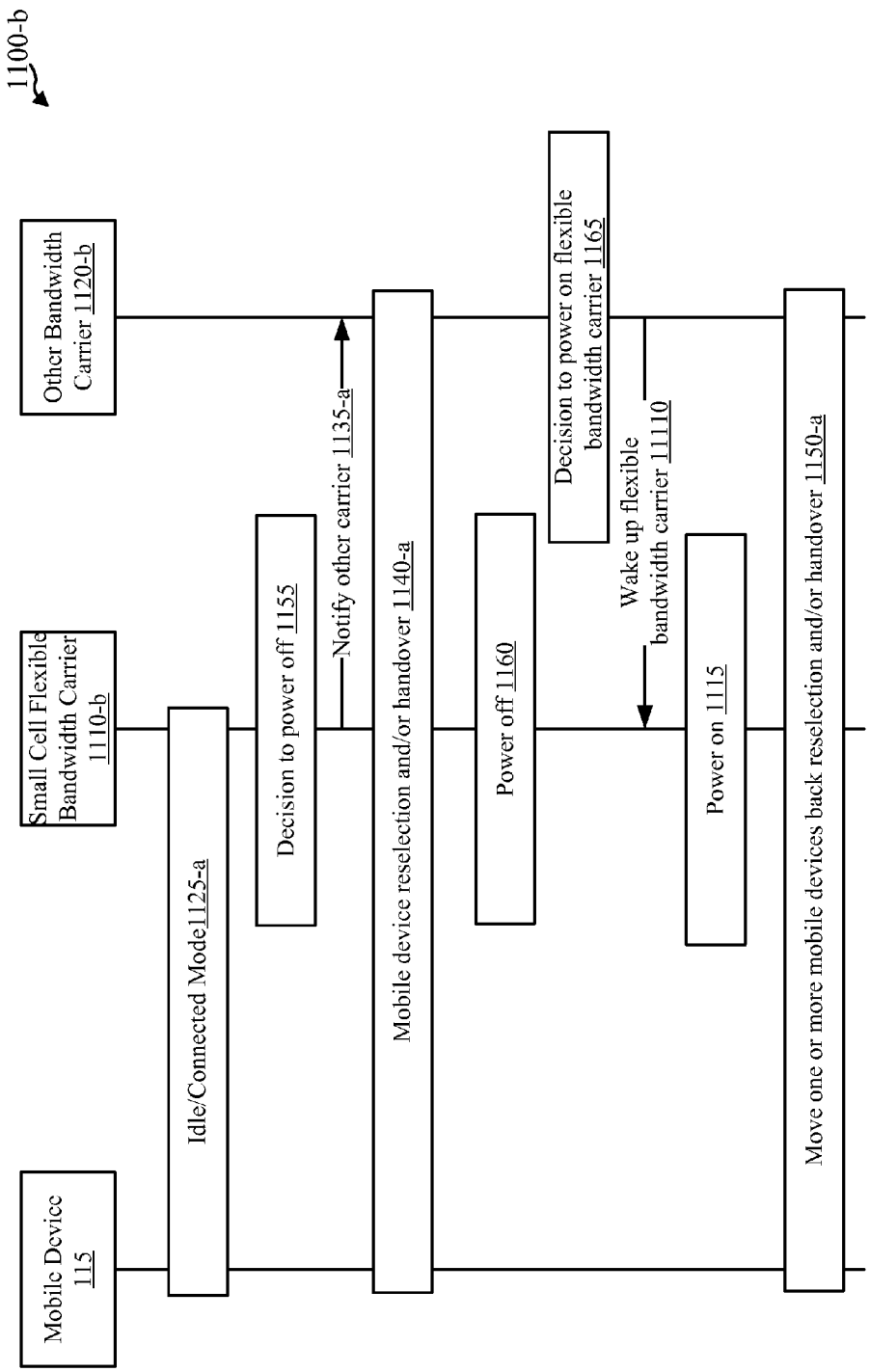
FIG. 11B shows a system communications diagram in accordance with various embodiments.

Turning now to FIG. 11B, a systems communications diagram 1100-b show one possible procedure for network energy savings in accordance with various embodiments. A mobile device 115 may be in an idle or connected mode, for example, with small cell flexible bandwidth carrier 1110-b as shown at block 1125-b. Small cell flexible bandwidth carrier 1110-b may be associated with a small cell 125 and/or gateway 140 as seen in FIG. 1 and/or FIG. 3, for example. Block 1155 reflects that a decision to change to power off may occur with respect to the small cell flexible bandwidth carrier 1110-b. While this may be made at a small cell, in some situations, a mobile device, controller, and/or network may make this decision as shown in FIG. 1, for example. Once triggered, one or more aspects of the system may coordinate the power off. For example, a gateway may coordinate changes in N. Another bandwidth carrier 1120-b may be notified 1135-a by small cell flexible bandwidth carrier 1110-b. The other bandwidth carrier 1120-b may be a normal bandwidth carrier or a flexible bandwidth carrier.

Some embodiments can mitigate the impact of the power off on the mobile devices in a variety of ways. For example, broadcast channel (BCCH) modification information may be utilized. As shown in the system communications diagram 1100-b, one or more other bandwidth carriers may be notified 1135-a that a power off may occur for the small cell flexible bandwidth carrier 1110-b. In some cases, messages may be broadcast to mobile devices regarding the power off. One or more mobile devices 115 may be handed over and/or reselected to one of the other bandwidth carriers as shown in block 1140-a. The power off may be implemented as shown in block 1160. The mobile device 115 may be moved back after the change as shown in block 1150-a. In some cases, system information may be modified to facilitate re-selection to other cells and back to cell after a change.

In some embodiments, a base station may receive a power off request from a network device, such as gateway. The small cell may implement the power off, as shown in block 1160. In some cases, the mobile devices 115 may be moved over to the flexible bandwidth carrier after the bandwidth change as shown in block 1150-a. A decision to power on the flexible bandwidth carrier 1110-b may be made as shown in block 1165. A wake-up signal may be sent to flexible bandwidth carrier 1170. The flexible bandwidth carrier may power on as shown in block 1175.

Some embodiments may include adapting flexible bandwidth for downlink and/or uplink carrier bandwidth for a small cell, allowing for variable downlink and/or uplink carrier bandwidth. For some wireless applications, throughput requirements for the downlink and uplink may differ; therefore, efficient allocation of spectrum may be achieved by dynamically changing the downlink and/or uplink bandwidth based on the traffic demands, for example. For more efficient placement, the carrier frequency channel numbers may also be changed during the bandwidth change. Some embodiments may utilize multiple flexible uplink carriers and/or flexible downlink carriers. Different users may be assigned to different flexible uplink carriers and/or flexible downlink carriers based on their individual needs. Furthermore, different flexible uplink carriers may be cross-coupled with different flexible downlink carriers.

Figure 12A:
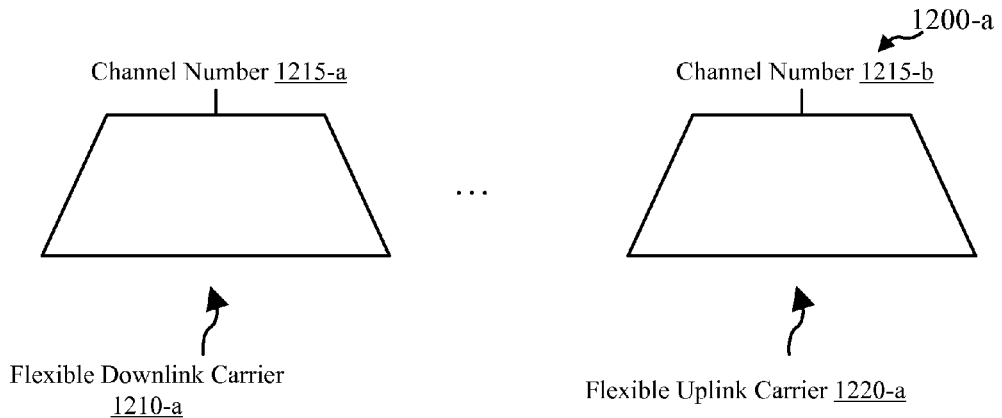
FIG. 12A shows a carrier system in accordance with various embodiments.
Figure 12B:
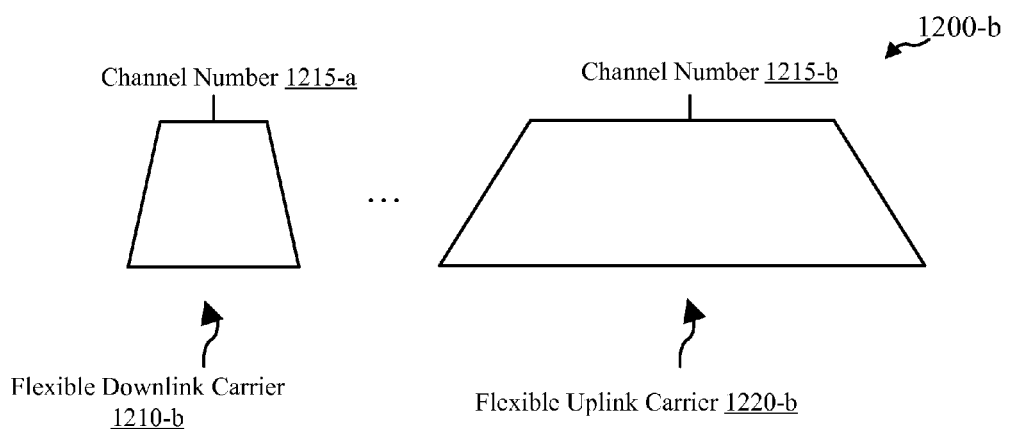
FIG. 12B shows a carrier system in accordance with various embodiments.
Figure 12C:
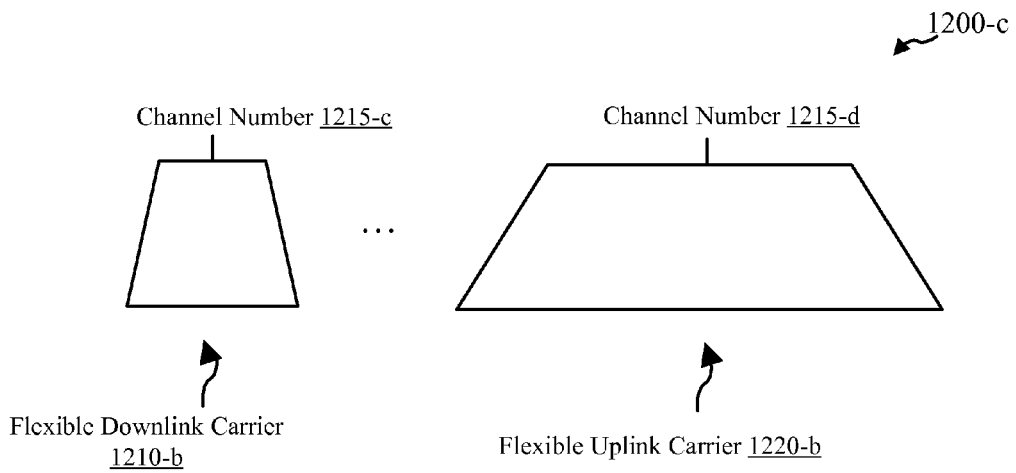
FIG. 12C shows a carrier system in accordance with various embodiments.
Figure 12D:
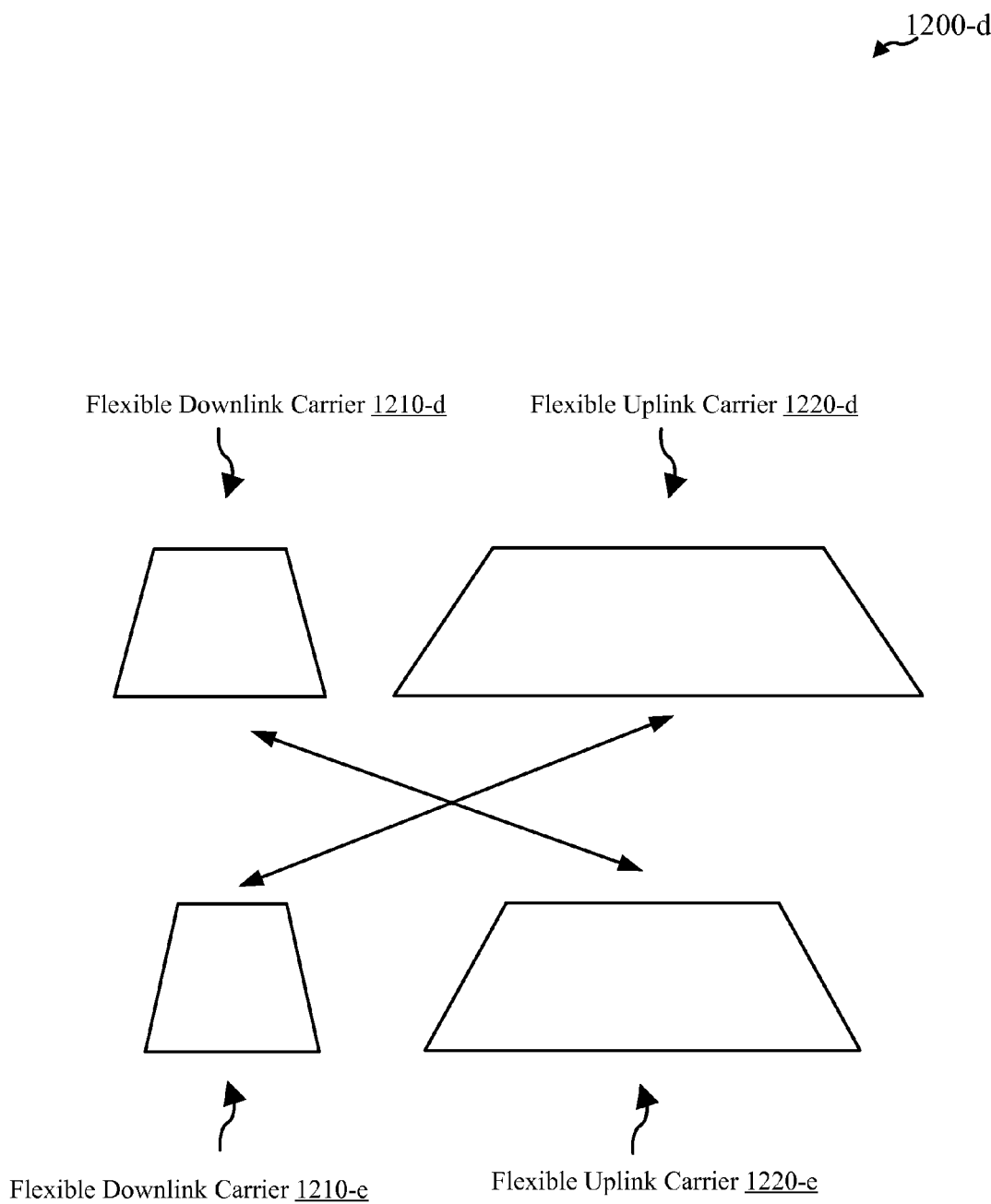
FIG. 12D shows a carrier system in accordance with various embodiments.

FIG. 12A shows a carrier system 1200-*a* that includes a flexible downlink carrier 1210-*a* and a flexible uplink carrier 1220-*a* in accordance with various embodiments. The flexible downlink carrier 1210-*a* and the flexible uplink carrier 1220-*a* may utilize the same bandwidth scaling factor, which may be referred to as S in this example (i.e., N=S). The flexible downlink carrier 1210-*a* may utilize a channel number 1215-*a* and the flexible uplink carrier 1220-*a* may utilize a channel number 1215-*b*. FIG. 12B shows a carrier system 1200-*b* that includes a flexible downlink carrier 1210-*b* and a flexible uplink carrier 1220-*b* in accordance with various embodiments. The flexible downlink carrier 1210-*b* may represent an adapted form of the flexible downlink carrier 1210-*a* of FIG. 12A, where the bandwidth scaling factor N=S has decreased to another bandwidth scaling factor N=M, where M<S. The flexible uplink carrier 1210-*b* may represent an adapted form of the flexible uplink carrier 1210-*a* of FIG. 12A, where the bandwidth scaling factor N=S has increased to another bandwidth scaling factor N=T, where T>S. In some embodiments, this bandwidth scaling factor may decrease. The flexible downlink carrier 1210-*a* may utilize a channel number 1215-*a* and the flexible uplink carrier 1220-*b* may utilize a channel number 1215-*b*, the same channel numbers as seen in FIG. 12A. FIG. 12C shows a carrier system 1200-*c* where the channel numbers 1215-*c* and 1215-*d* associated with flexible downlink carrier 1210-*b* and flexible uplink carrier 1220-*b* may be changed. This change in channel number may occur during the bandwidth channel. FIG. 12D shows a carrier system 1200-*d* where a flexible downlink carrier 1210-*d* may be cross-coupled with flexible uplink carrier 1220-*e*; similarly, flexible uplink carrier 1220-*d* may be cross-coupled with flexible downlink carrier 1210-*e*. With multiple carriers, some embodiments could utilize other configurations, such as 3 uplink N=2 coupeld with downlinks including 2 N=4 and 1 N=1. Some embodiments may utilize flexible bandwidth TDD carriers and/or flexible bandwidth supplemental carriers. In some cases, these flexible bandwidth carriers may be utilized for a small cell's downlink and/or uplink. In the case of supplemental carriers, they may typically be tied to a normal (as in uplink and downlink) carrier. In the case of TDD, some embodiments may utilize scenarios where there are multiple bandwidth scaling factors that may be optimized for uplink and/or downlink needs.

Figure 13:
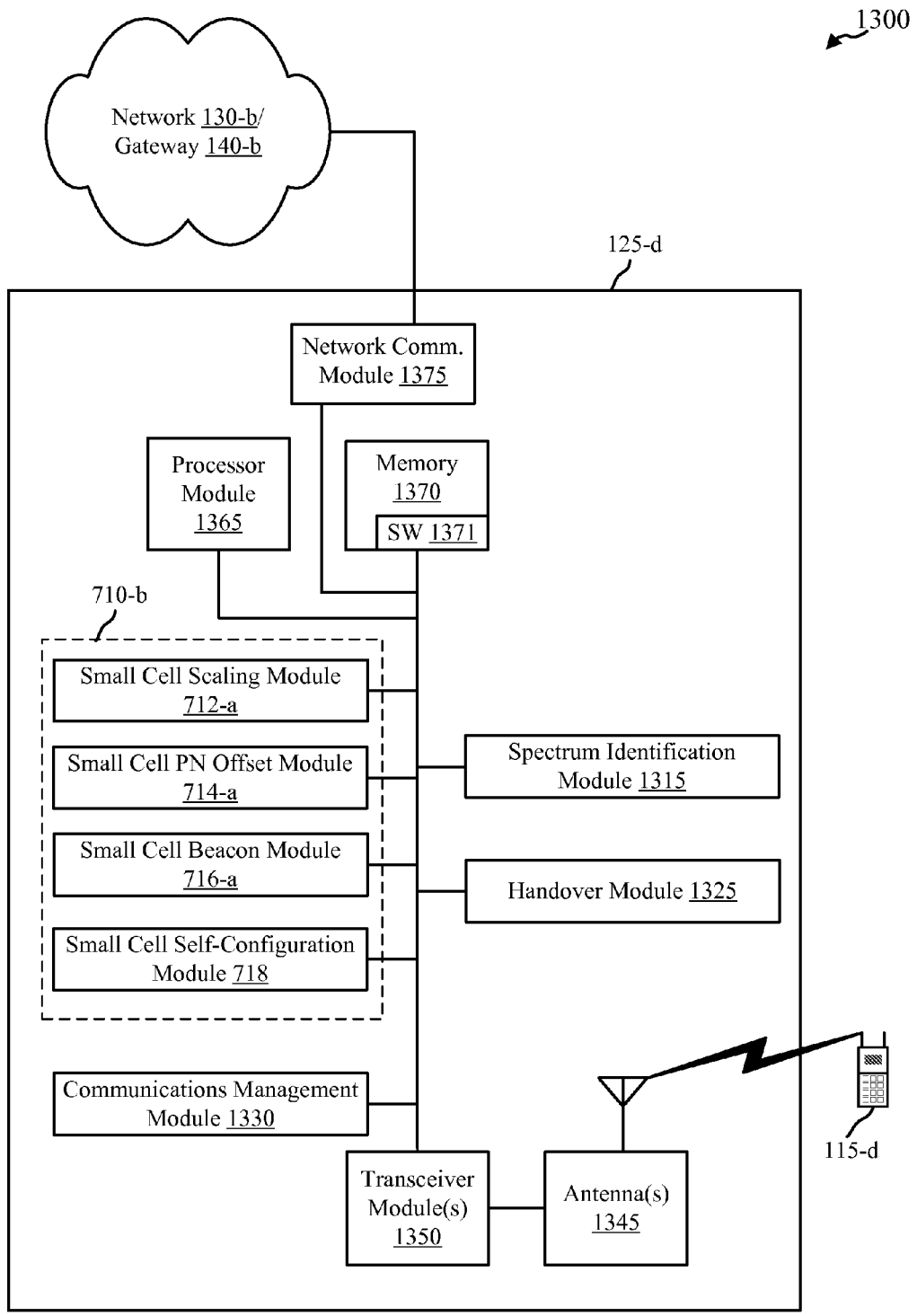
FIG. 13 shows a block diagram of a wireless communications system in accordance with various embodiments.

FIG. 13 shows a block diagram of a communications system 1300 that may be configured for utilizing flexible bandwidth for small cells in accordance with various embodiments. This system 1300 may be an example of aspects of the system 100 depicted in FIG. 1, systems 200 of FIG. 2, system 300 of FIG. 3, and/or system 1500 of FIG. 15. The small cell 125-*d* may include antennas 1345, a transceiver module 1350, memory 1370, and a processor module 1365, which each may be in communication, directly or indirectly, with each other (e.g., over one or more buses). The transceiver module 1350 may be configured to communicate bi-directionally, via the antennas 1345, with the mobile device 115-*d*, which may be a multi-mode mobile device. The transceiver module 1350 (and/or other components of the small cell 125-*d*) may also be configured to communicate bi-directionally with one or more networks. In some cases, the small cell 125-*d* may communicate with the network 130-*b* and/or gateway 140-*b* a through network communications module 1375. Small cell 125-*d* may be an example of a Home eNodeB base station and/or a Home NodeB base station in some embodiments. In some embodiments, small cell 125-*d* may communicate with other small cells wirelessly and/or through gateway 140-*b* and/or network 130-*b*.

The memory 1370 may include random access memory (RAM) and read-only memory (ROM). The memory 1370 may also store computer-readable, computer-executable software code 1371 containing instructions that are configured to, when executed, cause the processor module 1365 to perform various functions described herein (e.g., call processing, database management, message routing, etc.). Alternatively, the software 1371 may not be directly executable by the processor module 1365 but be configured to cause the computer, e.g., when compiled and executed, to perform functions described herein.

The processor module 1365 may include an intelligent hardware device, e.g., a central processing unit (CPU) such as those made by Intel® Corporation or AMD®, a microcontroller, an application-specific integrated circuit (ASIC), etc. The processor module 1365 may include a speech encoder (not shown) configured to receive audio via a microphone, convert the audio into packets (e.g., 30 ms in length) representative of the received audio, provide the audio packets to the transceiver module 1350, and provide indications of whether a user is speaking. Alternatively, an encoder may only provide packets to the transceiver module 1350, with the provision or withholding/suppression of the packet itself providing the indication of whether a user is speaking.

The transceiver module 1350 may include a modem configured to modulate the packets and provide the modulated packets to the antennas 1345 for transmission, and to demodulate packets received from the antennas 1345. While some examples of the small cell 125-*d* may include a single antenna 1345, the small cell 125-*d* preferably includes multiple antennas 1345 for multiple links which may support carrier aggregation. For example, one or more links may be used to support macro communications with mobile device 115-*d*.

According to the architecture of FIG. 13, the small cell 125-*d* may further include a communications management module 1330. The communications management module 1330 may manage communications with other small cells (not shown). By way of example, the communications management module 1330 may be a component of the small cell 125-*d* in communication with some or all of the other components of the small cell 125-*d* via a bus. Alternatively, functionality of the communications management module 1330 may be implemented as a component of the transceiver module 1350, as a computer program product, and/or as one or more controller elements of the processor module 1365.

The components for small cell 125-*d* may be configured to implement aspects discussed above with respect to devices 700 in FIG. 7 and may not be repeated here for the sake of brevity. The small cell scaling module 712-*a* may be an example of the small cell scaling module 712. The small cell PN offset module 714-*a* may be an example of the small cell PN offset module 712. The small cell beacon module 716-*a* may be an example of the small cell beacon module 716. The small cell self-configuration module 718-*a* may be an example of the small cell self-configuration module 718. The small cell flexible bandwidth module 710-*b* may be an example of the small cell flexible bandwidth module 710 and/or 710-*a*.

The small cell 125-*d* may also include a spectrum identification module 1315. The spectrum identification module 1315 may be utilized to identify spectrum available for flexible waveforms. In some embodiments, a handover module 1325 may be utilized to perform handover procedures of the mobile device 115-*d* from one base station 105 to another. For example, the handover module 1325 may perform a handover procedure of the mobile device 115-*d* from small cell 125-*d* to another where normal waveforms are utilized between the mobile device 115-*d* and other small cells and/or base stations and flexible waveforms are utilized between the mobile device and another small cell and/or base station. A scaling module 910-*b* may be utilized to scale and/or alter chip rates to generate flexible waveforms.

In some embodiments, the transceiver module 1350 in conjunction with antennas 1345, along with other possible components of small cell 125-*d*, may transmit information regarding flexible waveforms and/or bandwidth scaling factors from the small cell 125-*d* to the mobile device 115-*d*, to other small cells and/or base stations, gateway 140-*b*, and/or core network 130-*b*. In some embodiments, the transceiver module 1350 in conjunction with antennas 1345, along with other possible components of small cell 125-*d*, may transmit information to the mobile device 115-*d*, to other small cells and/or base stations, to gateway 140-*b*, and/or to core network 130-*b*, such as flexible waveforms and/or bandwidth scaling factors, such that these devices or systems may utilize flexible waveforms.

Figure 14:
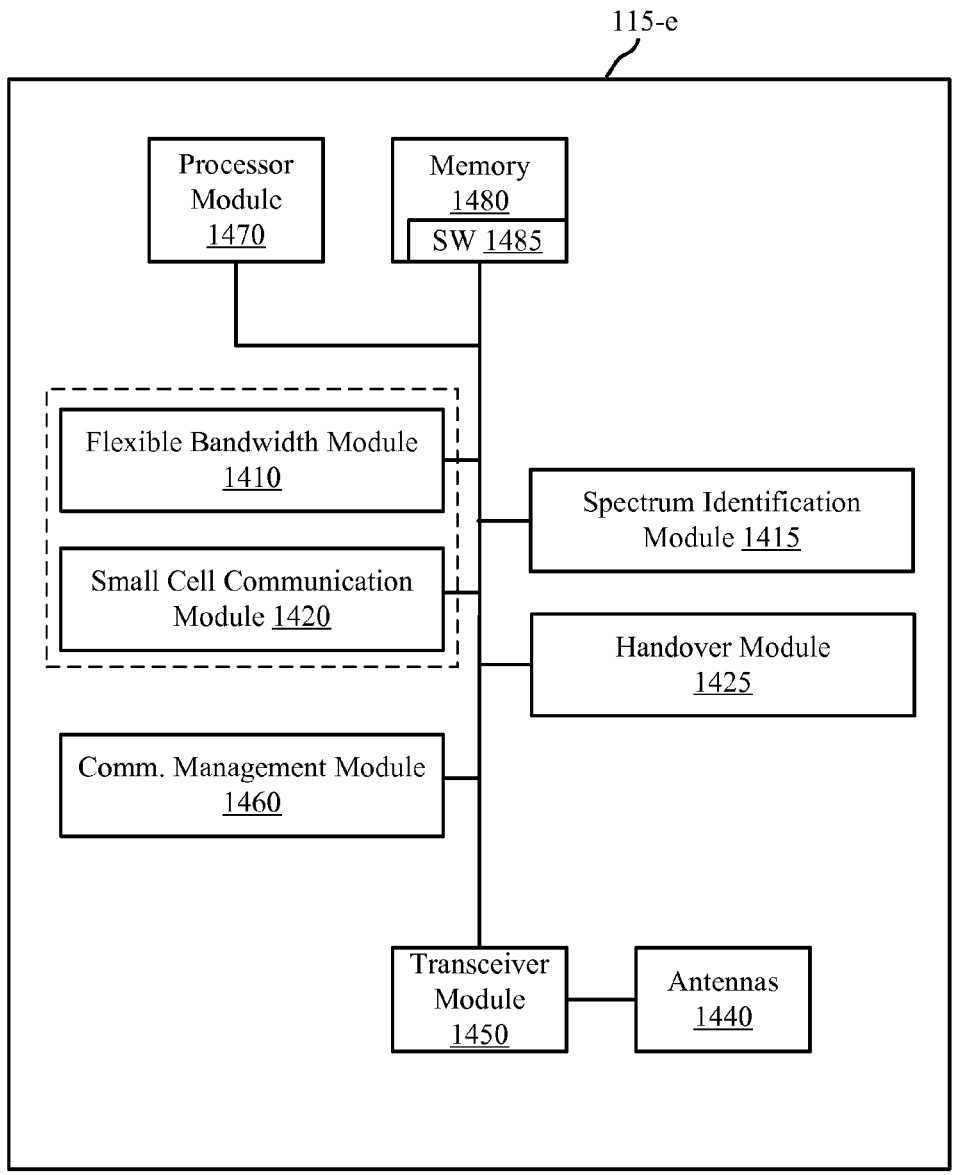
FIG. 14 shows a block diagram of a mobile device in accordance with various embodiments.

FIG. 14 is a block diagram 1400 of a mobile device 115-*e* configured to facilitate the use of flexible bandwidth in accordance with various embodiments. The mobile device 115-*e* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*e* may have an internal power supply (not shown), such as a small battery, to facilitate mobile operation. In some embodiments, the mobile device 115-*e* may be the mobile device 115 of FIG. 1, FIG. 2, FIG. 3, FIG. 13, and/or FIG. 15, and/or the device 700 of FIG. 7. The mobile device 115-*e* may be a multi-mode mobile device. The mobile device 115-*e* may be referred to as a wireless communications device in some cases.

The mobile device 115-*e* may include antennas 1440, a transceiver module 1450, memory 1480, and a processor module 1470, which each may be in communication, directly or indirectly, with each other (e.g., via one or more buses). The transceiver module 1450 is configured to communicate bi-directionally, via the antennas 1440 and/or one or more wired or wireless links, with one or more networks, as described above. For example, the transceiver module 1450 may be configured to communicate bi-directionally with base small cells of FIG. 1, FIG. 2, FIG. 3, FIG. 13, and/or FIG. 15. The transceiver module 1450 may include a modem configured to modulate the packets and provide the modulated packets to the antennas 1440 for transmission, and to demodulate packets received from the antennas 1440. While the mobile device 115-*e* may include a single antenna, the mobile device 115-*e* will typically include multiple antennas 1440 for multiple links.

The memory 1480 may include random access memory (RAM) and read-only memory (ROM). The memory 1480 may store computer-readable, computer-executable software code 1485 containing instructions that are configured to, when executed, cause the processor module 1470 to perform various functions described herein (e.g., call processing, database management, message routing, etc.). Alternatively, the software 1485 may not be directly executable by the processor module 1470 but be configured to cause the computer (e.g., when compiled and executed) to perform functions described herein.

The processor module 1470 may include an intelligent hardware device, e.g., a central processing unit (CPU) such as those made by Intel® Corporation or AMD®, a microcontroller, an application-specific integrated circuit (ASIC), etc. The processor module 1470 may include a speech encoder (not shown) configured to receive audio via a microphone, convert the audio into packets (e.g., 30 ms in length) representative of the received audio, provide the audio packets to the transceiver module 1450, and provide indications of whether a user is speaking. Alternatively, an encoder may only provide packets to the transceiver module 1450, with the provision or withholding/suppression of the packet itself providing the indication of whether a user is speaking.

According to the architecture of FIG. 14, the mobile device 115-*e* may further include a communications management module 1460. The communications management module 1460 may manage communications with other mobile devices 115. By way of example, the communications management module 1460 may be a component of the mobile device 115-*e* in communication with some or all of the other components of the mobile device 115-*e* via a bus. Alternatively, functionality of the communications management module 1460 may be implemented as a component of the transceiver module 1450, as a computer program product, and/or as one or more controller elements of the processor module 1470.

The components for mobile device 115-*e* may be configured to facilitate aspects discussed above with respect to devices 700 in FIG. 7. For example, flexible bandwidth module 1410 and/or small cell communication module 1420 may facilitate communication with small cells configured for flexible bandwidth.

The mobile device 115-*e* may also include a spectrum identification module 1415. The spectrum identification module 1415 may be utilized to identify spectrum available for flexible waveforms. In some embodiments, a handover module 1425 may be utilized to perform handover procedures of the mobile device 115-*e* between small cells and/or base stations. For example, the handover module 1425 may perform a handover procedure of the mobile device 115-*e* from a small cell to a base station and/or vice versa, where normal waveforms are utilized between the mobile device 115-*e* and the small cell and/or base station and flexible waveforms are utilized between the mobile device and another base station and/or small cell. A scaling module 910-*a* may be utilized to scale and/or alter chip rates to generate flexible waveforms.

In some embodiments, the transceiver module 1450, in conjunction with antennas 1440, along with other possible components of mobile device 115-*e*, may transmit information regarding flexible waveforms and/or bandwidth scaling factors from the mobile device 115-*e* to base stations or a core network. In some embodiments, the transceiver module 1450, in conjunction with antennas 1440, along with other possible components of mobile device 115-*e*, may transmit information, such as flexible waveforms and/or bandwidth scaling factors, to base stations or a core network such that these devices or systems may utilize flexible waveforms.

Figure 15:
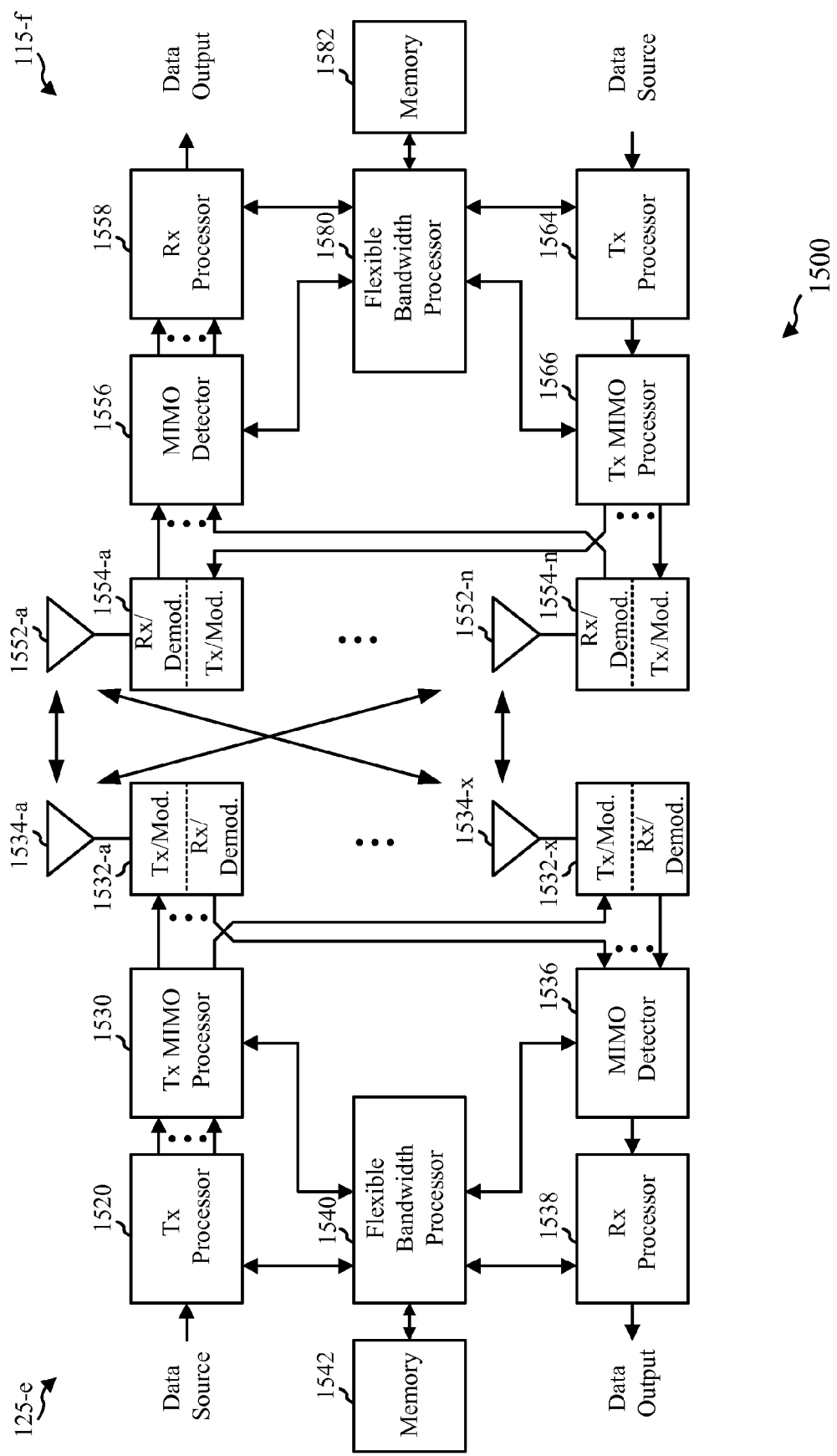
FIG. 15 shows a block diagram of a wireless communications system that includes a base station and a mobile device in accordance with various embodiments.

FIG. 15 is a block diagram of a system 1500 including a small cell 125-*e* and a mobile device 115-*f* in accordance with various embodiments. This system 1500 may be an example of the system 100 of FIG. 1, systems 200 of FIG. 2, system 300 of FIG. 3, and/or system 1300 of FIG. 13. The small cell 125-*e* may be equipped with antennas 1534-*a* through 1534-*x*, and the mobile device 115-*f* may be equipped with antennas 1552-*a* through 1552-*n*. At the small cell 125-*e*, a transmit processor 1520 may receive data from a data source.

The transmit processor 1520 may process the data. The transmit processor 1520 may also generate reference symbols, and a cell-specific reference signal. A transmit (TX) MIMO processor 1530 may perform spatial processing (e.g., precoding) on data symbols, control symbols, and/or reference symbols, if applicable, and may provide output symbol streams to the transmit modulators 1532-*a* through 1532-*x*. Each modulator 1532 may process a respective output symbol stream (e.g., for OFDM, etc.) to obtain an output sample stream. Each modulator 1532 may further process (e.g., convert to analog, amplify, filter, and upconvert) the output sample stream to obtain a downlink (DL) signal. In one example, DL signals from modulators 1532-*a* through 1532-*x* may be transmitted via the antennas 1534-*a* through 1534-*x*, respectively. The transmit processor 1520 may receive information from a flexible bandwidth processor 1540. The flexible bandwidth processor 1540 may be coupled with a memory 1542. The flexible bandwidth processor 1540 may be configured to generate flexible waveforms through altering a chip rate and/or utilizing a bandwidth scaling factor. In some embodiments, the processor module 1540 may be configured for dynamically adapting flexible bandwidth in accordance with various embodiments. The flexible bandwidth processor 1540 may dynamically adjust one or more bandwidth scaling factors of the flexible bandwidth signal associated with transmissions between small cell 125-*e* and mobile device 115-*f*. These adjustments may be made based on information such as traffic patterns, interference measurements, etc.

For example, within system 1500, the flexible bandwidth processor 1540 may be configured for implementing flexible bandwidth for small cell 125-*e*. For example, the flexible bandwidth processor 1540 may be configured to generate a flexible bandwidth carrier for the small cell 125-*e*. In some embodiments, the flexible bandwidth processor 1540 may utilize a first bandwidth scaling factor to generate the flexible bandwidth carrier. In some embodiments, the flexible bandwidth processor 1540 determines the first bandwidth scaling factor for the small cell 125-*e*.

In some embodiments, the flexible bandwidth processor 1540 determines additional bandwidth scaling factors, such as second bandwidth scaling factor for the small cell 125-*e*. The flexible bandwidth processor 1540 may adapt the flexible bandwidth carrier for the small cell 125-*e* from utilizing the first bandwidth scaling factor to utilizing another bandwidth scaling factor, such as the second bandwidth scaling factor. In some embodiments, adapting the flexible bandwidth carrier for the small cell 125-*e* from utilizing the first bandwidth scaling factor to utilizing the second bandwidth scaling factor increases a bandwidth of the flexible bandwidth carrier to support at least a traffic increase or a quality-of-service requirement.

In some embodiments, the flexible bandwidth processor 1540 determines at least a number of users to be support by the small cell 125-*e* or a traffic demand for one or more users of the small cell 125-*e*. The flexible bandwidth processor 1540 may utilize at least the determined number of users or the determined traffic demand to determine the first bandwidth scaling factor. The flexible bandwidth processor 1540 may change a channel number of the small cell when utilizing the flexible bandwidth carrier.

The flexible bandwidth processor 1540 may generate a beacon-like state for the small cell 125-*e* utilizing the flexible bandwidth carrier through altering a transmit power of the small cell utilizing the flexible bandwidth carrier. In some embodiments, the transmit power of the small cell utilizing the flexible bandwidth carrier is less than a transmit power for the small cell 125-*e* utilizing a normal bandwidth carrier. In some embodiments, the power spectrum density of the small cell 125-*e* utilizing the flexible bandwidth carrier is greater than a power spectrum density for the small cell utilizing a normal bandwidth carrier. The flexible bandwidth processor 1540 may generate the beacon-like state for the small cell 125-*e* to enhance a range of the small cell for small cell detection.

In some embodiments, the flexible bandwidth processor 1540 is configured to decrease a PN offset separation in dilated chips between the small cell 125-*e* and another small cell compared to a PN offset separation for a normal bandwidth carrier based on the bandwidth scaling factor. Decreasing the PN offset separation in dilated chips may increase a number of unique PN offsets associated with the small cell 125-*e* and at least one other small cell. Increasing the number of unique PN offsets may result in unique small cell identification that facilitates macrocell to small cell hand-in.

The flexible bandwidth processor 1540 may be configured to determine a portion of a normal bandwidth channel of a macrocell for the small cell 125-*e* to operate within utilizing the flexible bandwidth carrier. The flexible bandwidth processor 1540 may be configured to transmit information regarding the portion of the normal bandwidth channel for the small cell to operate within. In some embodiments, the flexible bandwidth processor 1540 is configured to receive information from another small cell regarding a portion of a normal channel in which the other small cell has determined to operate within utilizing another flexible bandwidth carrier. The flexible bandwidth processor 1540 may determine another portion of the normal channel to operate within based on the received information utilizing the flexible bandwidth carrier. The information from the other small cell regarding the portion of the normal channel in which the other small cell has determined to operate within utilizing another flexible bandwidth carrier may utilize the small cell's network-utilizing mode.

At the mobile device 115-*f*, the mobile device antennas 1552-*a* through 1552-*n* may receive the DL signals from the small cell 125-*e* and may provide the received signals to the demodulators 1554-*a* through 1554-*n*, respectively. Each demodulator 1554 may condition (e.g., filter, amplify, downconvert, and digitize) a respective received signal to obtain input samples. Each demodulator 1554 may further process the input samples (e.g., for OFDM, etc.) to obtain received symbols. A MIMO detector 1556 may obtain received symbols from all the demodulators 1554-*a* through 1554-*n*, perform MIMO detection on the received symbols, if applicable, and provide detected symbols. A receive processor 1558 may process (e.g., demodulate, deinterleave, and decode) the detected symbols, providing decoded data for the mobile device 115-*f* to a data output, and provide decoded control information to a flexible bandwidth processor 1580, or memory 1582.

On the uplink (UL) or reverse link, at the mobile device 115-*f*, a transmit processor 1564 may receive and process data from a data source. The transmitter processor 1564 may also generate reference symbols for a reference signal. The symbols from the transmitter processor 1564 may be precoded by a transmit MIMO processor 1566, if applicable, further processed by the demodulators 1554-*a* through 1554-*n* (e.g., for SC-FDMA, etc.), and be transmitted to the small cell 125-*e* in accordance with the transmission parameters received from the small cell 125-*e*. The transmitter processor 1564 may also be configured to generate flexible waveforms through altering a chip rate and/or utilizing a bandwidth scaling factor; this may be done dynamically in some cases. The transmitter processor 1564 may receive information from the flexible bandwidth processor 1580. The flexible bandwidth processor 1580 may provide for different alignment and/or offsetting procedures. The flexible bandwidth processor 1580 may also utilize scaling and/or chip rate information to perform measurements on the other subsystems, perform handoffs to the other subsystems, perform reselection, etc. The flexible bandwidth processor 1580 may invert the effects of time stretching associated with the use of flexible bandwidth through parameter scaling. At the small cell 125-*e*, the UL signals from the mobile device 115-*f* may be received by the antennas 1534, processed by the demodulators 1532, detected by a MIMO detector 1536, if applicable, and further processed by a receiver processor. The receiver processor 1538 may provide decoded data to a data output and to the flexible bandwidth processor 1580. In some embodiments, the flexible bandwidth processor 1580 may be implemented as part of a general processor, the transmitter processor 1564, and/or the receiver processor 1558.

Figure 16A:
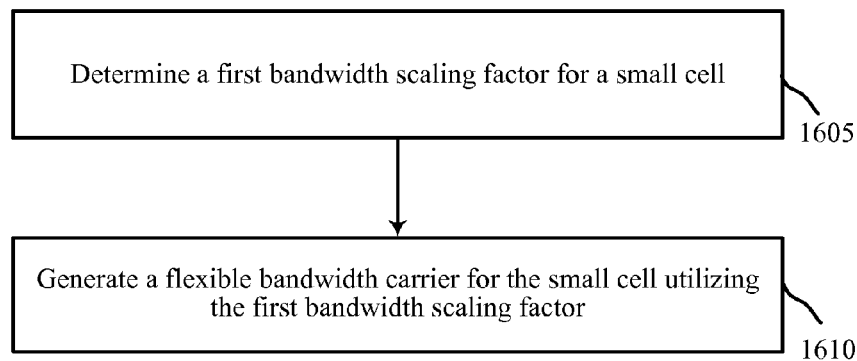
FIG. 16A shows a flow diagram of a method for implementing flexible bandwidth small cells in accordance with various embodiments.

Turning to FIG. 16A, a flow diagram of a method 1600-*a* for implementing flexible bandwidth small cells in accordance with various embodiments. Method 1600-*a* may be implemented utilizing various wireless communications devices and/or systems including, but not limited to: a small cell 125 as seen in FIG. 1, FIG. 2, FIG. 3, FIG. 13, and/or FIG. 15, a mobile device 115 as seen in FIG. 1, FIG. 2, FIG. 3, FIG. 13, FIG. 14, and/or FIG. 15; and/or a device 700 of FIG. 7.

At block 1605, a first bandwidth scaling factor for a small cell may be determined. At block 1610, a flexible bandwidth carrier for the small cell may be generated utilizing the first bandwidth scaling factor.

Some embodiments may further include determining additional bandwidth scaling factors, such as second bandwidth scaling factor for the small cell. The flexible bandwidth carrier for the small cell may be adapted from utilizing the first bandwidth scaling factor to utilizing another bandwidth scaling factor, such as the second bandwidth scaling factor. In some embodiments, adapting the flexible bandwidth carrier for the small cell from utilizing the first bandwidth scaling factor to utilizing the second bandwidth scaling factor increases a bandwidth of the flexible bandwidth carrier to supported at least a traffic increase or a quality of service requirement.

Some embodiments utilize different flexible bandwidths for uplink and downlink. In one embodiment, one of uplink or downlink can be full bandwidth carrier while the other is flexible bandwidth carrier with bandwidth scaling factor greater than 1. If the traffic is more in downlink, then downlink could be full bandwidth and vice versa. For example, flexible bandwidth small cells may utilize flexible bandwidths for downlink and uplink to conserve energy when the quality of service requirements of small cell mobiles can be met with flexible bandwidth carriers. In some embodiments, generating the flexible bandwidth carrier for the small cell utilizing the first bandwidth scaling factor includes generating the flexible bandwidth carrier for uplink, where a bandwidth for downlink for the small cell is different from the uplink. In some embodiments, generating the flexible bandwidth carrier for the small cell utilizing the first bandwidth scaling factor includes generating the flexible bandwidth carrier for downlink, where a bandwidth for uplink for the small cell is different from the downlink. Some embodiments include c hanging at least a first channel number or a first center frequency with respect to the uplink and at least a second channel number or a second center frequency with respect to the downlink. Some embodiments include changing at least a channel number or center frequency of the small cell when utilizing the flexible bandwidth carrier when adapting the flexible bandwidth carrier for the small cell from utilizing the first bandwidth scaling factor to utilizing the second bandwidth scaling factor.

In some embodiments, at least a number of users to be support by the small cell or a traffic demand for one or more users of the small cell may be determined. At least the determined number of users or the determined traffic demand may be utilized to determine the first bandwidth scaling factor. A channel number of the small cell may be changed when utilizing the flexible bandwidth carrier.

Some embodiments further include generating a beacon-like state for the small cell utilizing the flexible bandwidth carrier through altering a transmit power of the small cell utilizing the flexible bandwidth carrier. In some embodiments, the transmit power of the small cell utilizing the flexible bandwidth carrier is less than a transmit power for the small cell utilizing a normal bandwidth carrier. In some embodiments, the power spectrum density of the small cell utilizing the flexible bandwidth carrier is greater than a power spectrum density for the small cell utilizing a normal bandwidth carrier. The beacon-like state for the small cell may be generated to enhance a range of the small cell for small cell detection. Some embodiments include generating a beacon-like state for the small cell utilizing a normal bandwidth carrier along with a flexible bandwidth carrier. Some embodiments include generating a normal bandwidth carrier for the small cell along with a flexible bandwidth beacon-like state. Some embodiments include generating a flexible bandwidth carrier for the small cell along with a flexible bandwidth beacon-like state.

Some embodiments further include decreasing a PN offset separation in dilated chips between the small cell and another small cell compared to a PN offset separation for a normal bandwidth carrier based on the bandwidth scaling factor. Decreasing the PN offset separation in dilated chips may increase a number of unique PN offsets associated with the small cell and at least one other small cell. Increasing the number of unique PN offsets may result in unique small cell identification that facilitates macrocell to small cell hand-in. In this case, the macrocell may or may not use flexible bandwidth carrier. In some embodiments, increasing the number of unique PN offsets results in unique small cell identification that facilitates small cell to small cell handover. In some embodiments, the bandwidth scaling factor may be utilized to facilitate small cell identification.

Some embodiments further include determining a portion of a bandwidth channel of a macrocell for the small cell to operate within utilizing the flexible bandwidth carrier. Some embodiments transmit information regarding the portion of the bandwidth channel for the small cell to operate within. Information may be received from another small cell regarding a portion of a channel in which the other small cell has determined to operate within utilizing another flexible bandwidth carrier. Some embodiments include determining another portion of the channel to operate within based on the received information utilizing the flexible bandwidth carrier. The information from the other small cell regarding the portion of the channel in which the other small cell has determined to operate within utilizing another flexible bandwidth carrier may utilize the small cell's network utilizing mode. In some embodiments, the bandwidth channel of the macrocell may be a normal bandwidth channel of the macrocell.

Figure 16B:
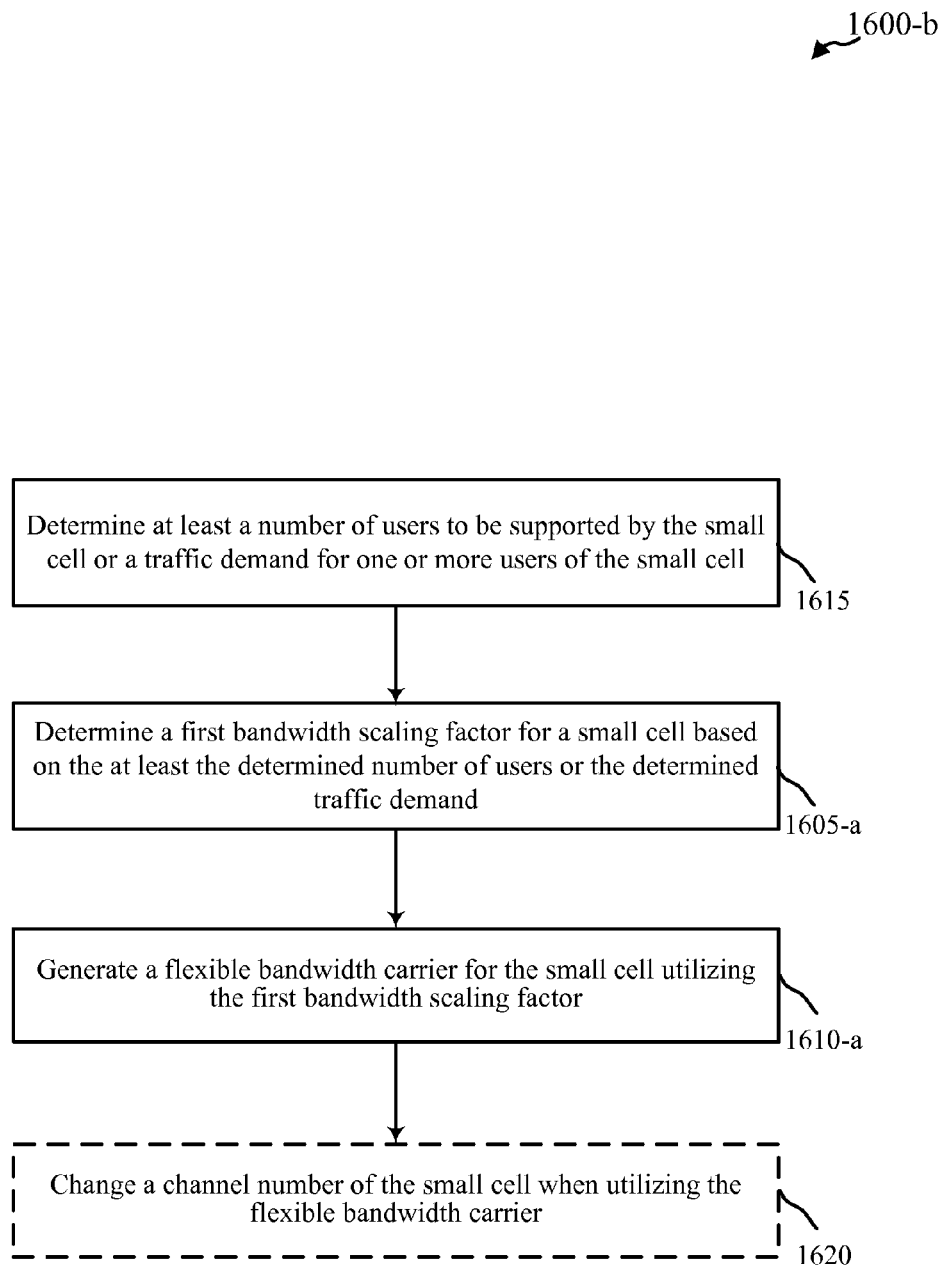
FIG. 16B shows a flow diagram of a method for implementing flexible bandwidth small cells in accordance with various embodiments.

Turning to FIG. 16B, a flow diagram of a method 1600-*b* for implementing flexible bandwidth small cells in accordance with various embodiments. Method 1600-*b* may be implemented utilizing various wireless communications devices and/or systems including, but not limited to: a small cell 125 as seen in FIG. 1, FIG. 2, FIG. 3, FIG. 13, and/or FIG. 15, a mobile device 115 as seen in FIG. 1, FIG. 2, FIG. 3, FIG. 13, FIG. 14, and/or FIG. 15; and/or a device 700 of FIG. 7. Method 1600-*b* may be an example of method 1600-*a*.

At block 1615, at least a number of users to be supported by the small cell or a traffic demand for one or more users of the small cell may be determined. At block 1605-*a*, a first bandwidth scaling factor for a small cell may be determined based on at least the determined number of users or the determined traffic demand. At block 1610-*a*, a flexible bandwidth carrier for the small cell may be generated utilizing the first bandwidth scaling factor. At block 1620, a channel number of the small cell may be changed when utilizing the flexible bandwidth carrier.

Some embodiments further include determining additional bandwidth scaling factors, such as a second bandwidth scaling factor for the small cell. The flexible bandwidth carrier for the small cell may be adapted from utilizing the first bandwidth scaling factor to utilizing another bandwidth scaling factor, such as the second bandwidth scaling factor. In some embodiments, adapting the flexible bandwidth carrier for the small cell from utilizing the first bandwidth scaling factor to utilizing the second bandwidth scaling factor increases a bandwidth of the flexible bandwidth carrier to support at least a traffic increase or a quality-of-service requirement.

Figure 16C:
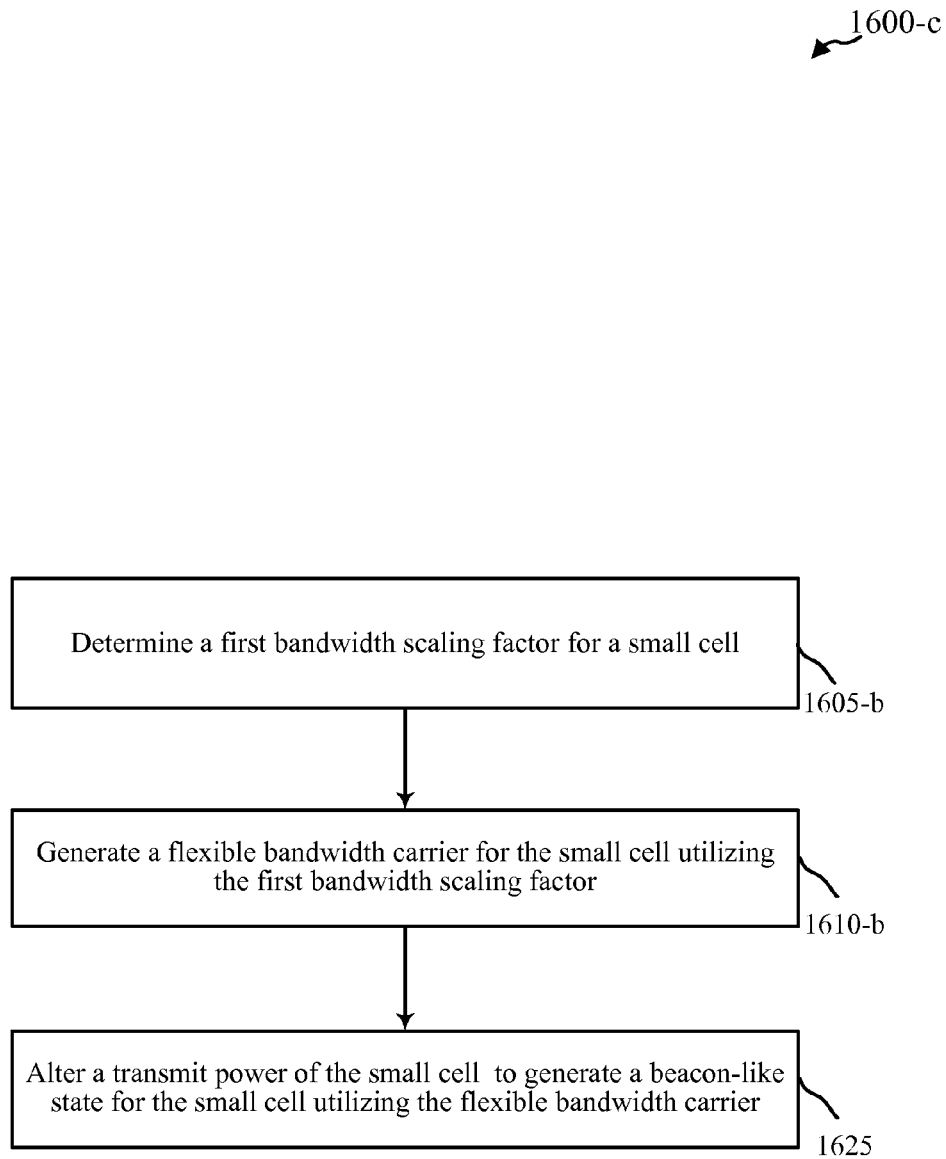
FIG. 16C shows a flow diagram of a method for implementing flexible bandwidth small cells in accordance with various embodiments.

Turning to FIG. 16C, a flow diagram of a method 1600-*c* for implementing flexible bandwidth small cells in accordance with various embodiments. Method 1600-*c* may be implemented utilizing various wireless communications devices and/or systems including, but not limited to: a small cell 125 as seen in FIG. 1, FIG. 2, FIG. 3, FIG. 13, and/or FIG. 15, a mobile device 115 as seen in FIG. 1, FIG. 2, FIG. 3, FIG. 13, FIG. 14, and/or FIG. 15; and/or a device 700 of FIG. 7. Method 1600-*c* may be an example of method 1600-*a*.

At block 1605-*b*, a first bandwidth scaling factor for a small cell may be determined. At block 1610-*b*, a flexible bandwidth carrier for the small cell may be generated utilizing the first bandwidth scaling factor. At block 1625, a transmit power of the small cell may be altered to generate a beacon-like state for the small cell utilizing the flexible bandwidth carrier. In some embodiments, the transmit power of the small cell utilizing the flexible bandwidth carrier is less than a transmit power for the small cell utilizing a normal bandwidth carrier. In some embodiments, the power spectrum density of the small cell utilizing the flexible bandwidth carrier is greater than a power spectrum density for the small cell utilizing a normal bandwidth carrier. The beacon-like state for the small cell may be generated to enhance a range of the small cell for small cell detection.

Figure 16D:
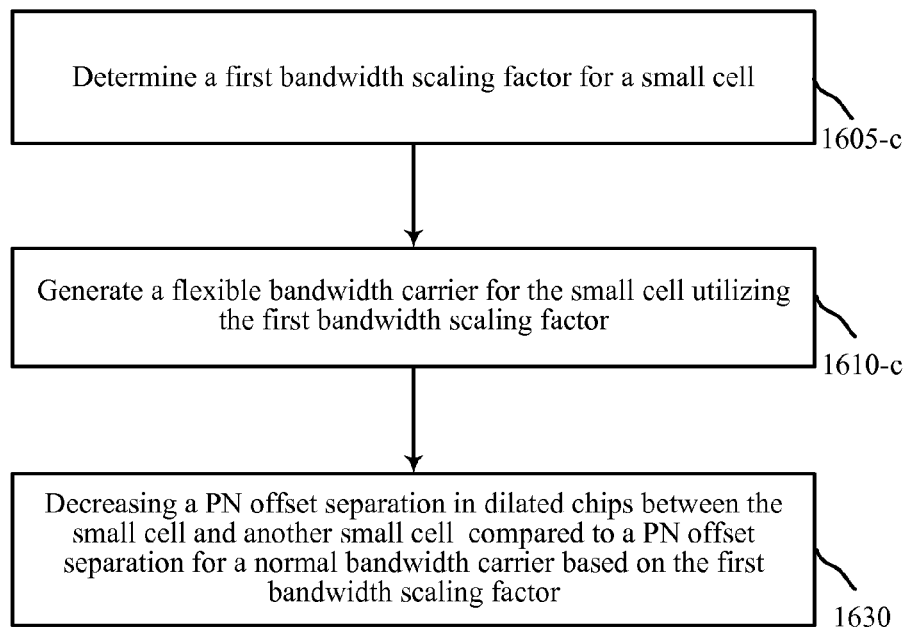
FIG. 16D shows a flow diagram of a method for implementing flexible bandwidth small cells in accordance with various embodiments.

Turning to FIG. 16D, a flow diagram of a method 1600-*d* for implementing flexible bandwidth small cells in accordance with various embodiments. Method 1600-*d* may be implemented utilizing various wireless communications devices and/or systems including, but not limited to: a small cell 125 as seen in FIG. 1, FIG. 2, FIG. 3, FIG. 13, and/or FIG. 15, a mobile device 115 as seen in FIG. 1, FIG. 2, FIG. 3, FIG. 13, FIG. 14, and/or FIG. 15; and/or a device 700 of FIG. 7. Method 1600-*d* may be an example of 1600-*a*.

At block 1605-*c*, a first bandwidth scaling factor for a small cell may be determined. At block 1610-*c*, a flexible bandwidth carrier for the small cell may be generated utilizing the first bandwidth scaling factor. At block 1630, a PN offset separation in dilated chips between the small cell and another small cell may be decreased compared to a PN offset separation for a normal bandwidth carrier based on the first bandwidth scaling factor. Decreasing the PN offset separation in dilated chips may increase a number of unique PN offsets associated with the small cell and at least one other small cell. Increasing the number of unique PN offsets may result in unique small cell identification that facilitates macrocell to small cell hand-in.

Figure 16E:
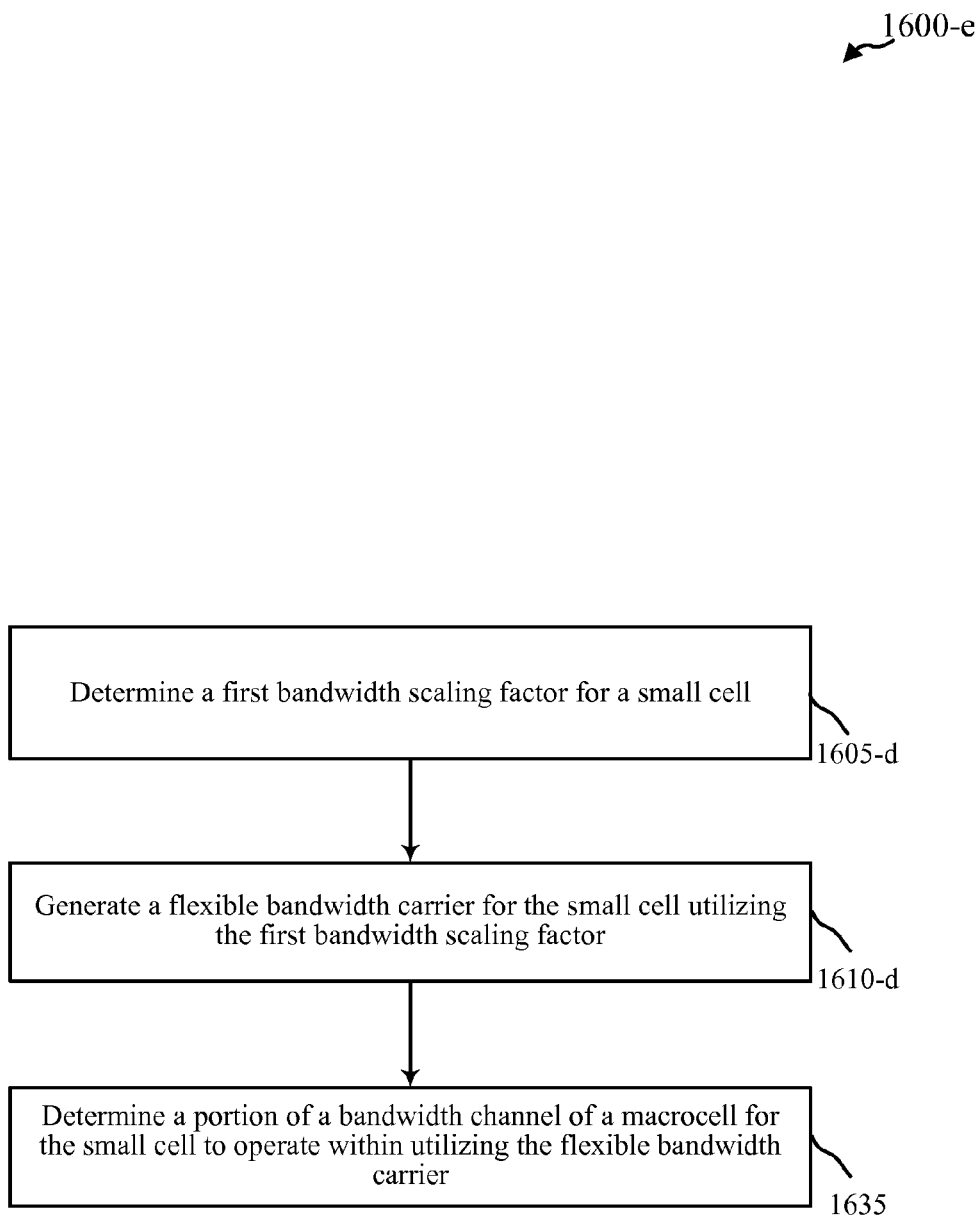
FIG. 16E shows a flow diagram of a method for implementing flexible bandwidth small cells in accordance with various embodiments.

Turning to FIG. 16E, a flow diagram of a method 1600-*e* for implementing flexible bandwidth small cells in accordance with various embodiments. Method 1600-*e* may be implemented utilizing various wireless communications devices and/or systems including, but not limited to: a small cell 125 as seen in FIG. 1, FIG. 2, FIG. 3, FIG. 13, and/or FIG. 15, a mobile device 115 as seen in FIG. 1, FIG. 2, FIG. 3, FIG. 13, FIG. 14, and/or FIG. 15; and/or a device 700 of FIG. 7. Method 1600-*e* may be an example of method 1600-*a* of FIG. 16A.

At block 1605-*d*, a first bandwidth scaling factor for a small cell may be determined. At block 1610-*d*, a flexible bandwidth carrier for the small cell may be generated utilizing the first bandwidth scaling factor. At block 1635, a portion of a bandwidth channel of a macrocell for the small cell may be determined to operate within utilizing the flexible bandwidth carrier. Some embodiments transmit information regarding the portion of the bandwidth channel for the small cell to operate within. Information may be received from another small cell regarding a portion of a channel in which the other small cell has determined to operate within utilizing another flexible bandwidth carrier. Some embodiments include determining another portion of the channel to operate within based on the received information utilizing the flexible bandwidth carrier. The information from the other small cell regarding the portion of the channel in which the other small cell has determined to operate within utilizing another flexible bandwidth carrier may utilize the small cell's network utilizing mode. In some embodiments, the bandwidth channel of the macrocell may be a normal bandwidth channel of the macrocell.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for implementing flexible bandwidth small cells, the method comprising:
   determining a first bandwidth scaling factor for a small cell;
   generating a flexible bandwidth carrier for the small cell utilizing the first bandwidth scaling factor;
   receiving a trigger to dynamically adjust the flexible bandwidth carrier;
   determining, in response to the trigger, a second bandwidth scaling factor for the small cell, wherein at least one of the first bandwidth scaling factor or the second bandwidth scaling factor is based on a number of users to be supported by the small cell or a traffic demand for one or more users of the small cell; and
   adapting the flexible bandwidth carrier for the small cell from utilizing the first bandwidth scaling factor to utilizing the second bandwidth scaling factor.

2. The method of claim 1, wherein adapting the flexible bandwidth carrier for the small cell from utilizing the first bandwidth scaling factor to utilizing the second bandwidth scaling factor increases a bandwidth of the flexible bandwidth carrier to support at least a traffic increase or a quality of service requirement.

3. The method of claim 1, further comprising:
   changing at least a channel number or a center frequency of the small cell when utilizing the flexible bandwidth carrier.

4. The method of claim 1, further comprising:
   generating a beacon-like state for the small cell utilizing the flexible bandwidth carrier through altering a transmit power of the small cell utilizing the flexible bandwidth carrier.

5. The method of claim 4, wherein the transmit power of the small cell utilizing the flexible bandwidth carrier is less than a transmit power for the small cell utilizing a normal bandwidth carrier.

6. The method of claim 4, wherein the power spectrum density of the small cell utilizing the flexible bandwidth carrier is greater than a power spectrum density for the small cell utilizing a normal bandwidth carrier.

7. The method of claim 4, wherein generating the beacon-like state for the small cell enhances a range of the small cell for the user equipment detection of the small cell.

8. The method of claim 1, further comprising:
   generating a beacon-like state for the small cell utilizing a normal bandwidth carrier.

9. The method of claim 4, further comprising:
   generating a normal bandwidth carrier for the small cell.

10. The method of claim 1, further comprising:
    decreasing a PN offset separation in dilated chips between the small cell and another small cell compared to a PN offset separation for a normal bandwidth carrier based on the bandwidth scaling factor.

11. The method of claim 10, wherein decreasing the PN offset separation in dilated chips increases a number of unique PN offsets associated with the small cell and at least one other small cell.

12. The method of claim 11, wherein increasing the number of unique PN offsets results in unique small cell identification that facilitates macrocell to small cell hand-in.

13. The method of claim 11, wherein increasing the number of unique PN offsets results in unique small cell identification that facilitates small cell to small cell handover.

14. The method of claim 1, further comprising:
determining a portion of a bandwidth channel of a macrocell for the small cell to operate within utilizing the flexible bandwidth carrier; and
transmitting information regarding the portion of the bandwidth channel for the small cell to operate within.

15. The method of claim 1, further comprising:
receiving information from another small cell regarding a portion of a channel in which the other small cell has determined to operate within utilizing another flexible bandwidth carrier; and
determining another portion of the channel to operate within based on the received information utilizing the flexible bandwidth carrier.

16. The method of claim 15, wherein receiving the information from the other small cell regarding the portion of the channel in which the other small cell has determined to operate within utilizing another flexible bandwidth carrier utilizes a network-utilizing mode of the small cell.

17. The method of claim 1, wherein generating the flexible bandwidth carrier for the small cell utilizing the first bandwidth scaling factor comprises generating the flexible bandwidth carrier for uplink, wherein a bandwidth for downlink for the small cell is different from the uplink.

18. The method of claim 17, further comprising:
changing at least a first channel number or a first center frequency with respect to the uplink and at least a second channel number or a second center frequency with respect to the downlink.

19. The method of claim 1, wherein generating the flexible bandwidth carrier for the small cell utilizing the first bandwidth scaling factor comprises generating the flexible bandwidth carrier for downlink, wherein a bandwidth for uplink for the small cell is different from the downlink.

20. The method of claim 1, further comprising:
changing at least a channel number or center frequency of the small cell when adapting the flexible bandwidth carrier for the small cell from utilizing the first bandwidth scaling factor to utilizing the second bandwidth scaling factor.

21. The method of claim 1, further comprising:
utilizing at least the first or the second bandwidth scaling factor to increase a number of unique PN offsets and facilitate small cell identification.

22. A wireless communications system configured for implementing flexible bandwidth small cells, the system comprising:
means for determining a first bandwidth scaling factor for a small cell;
means for generating a flexible bandwidth carrier for the small cell utilizing the first bandwidth scaling factor;
means for receiving a trigger to dynamically adjust the flexible bandwidth carrier;
means for determining, in response to the trigger, a second bandwidth scaling factor for the small cell, wherein at least one of the first bandwidth scaling factor or the second bandwidth scaling factor is based on a number of users to be supported by the small cell or a traffic demand for one or more users of the small cell; and
means for adapting the flexible bandwidth carrier for the small cell from utilizing the first bandwidth scaling factor to utilizing the second bandwidth scaling factor.

23. The wireless communications system of claim 22, further comprising:
means for changing a channel number of the small cell when utilizing the flexible bandwidth carrier.

24. The wireless communications system of claim 22, further comprising:
means for generating a beacon-like state for the small cell utilizing the flexible bandwidth carrier through altering a transmit power of the small cell utilizing the flexible bandwidth carrier.

25. The wireless communications system of claim 22, further comprising:
means for decreasing a PN offset separation in dilated chips between the small cell and another small cell compared to a PN offset separation for a normal bandwidth carrier based on the bandwidth scaling factor.

26. The wireless communications system of claim 22, further comprising:
means for determining a portion of a bandwidth channel of a macrocell for the small cell to operate within utilizing the flexible bandwidth carrier; and
means for transmitting information regarding the portion of the bandwidth channel for the small cell to operate within.

27. The wireless communications system of claim 22, further comprising:
means for receiving information from another small cell regarding a portion of a channel in which the other small cell has determined to operate within utilizing another flexible bandwidth carrier; and
means for determining another portion of the channel to operate within based on the received information utilizing the flexible bandwidth carrier.

28. A computer program product for implementing flexible bandwidth small cells comprising:
a non-transitory computer-readable medium comprising:
code for determining a first bandwidth scaling factor for a small cell;
code for generating a flexible bandwidth carrier for the small cell utilizing the first bandwidth scaling factor;
code for receiving a trigger to dynamically adjust the flexible bandwidth carrier;
code for determining, in response to the trigger, a second bandwidth scaling factor for the small cell, wherein at least one of the first bandwidth scaling factor or the second bandwidth scaling factor is based on a number of users to be supported by the small cell or a traffic demand for one or more users of the small cell; and
code for adapting the flexible bandwidth carrier for the small cell from utilizing the first bandwidth scaling factor to utilizing the second bandwidth scaling factor.

29. The computer program product of claim 28, wherein the non-transitory computer-readable medium further comprising:
code for changing a channel number of the small cell when utilizing the flexible bandwidth carrier.

30. The computer program product of claim 28, wherein the non-transitory computer-readable medium further comprising:
code for generating a beacon-like state for the small cell utilizing the flexible bandwidth carrier through altering a transmit power of the small cell utilizing the flexible bandwidth carrier.

31. The computer program product of claim 28, wherein the non-transitory computer-readable medium further comprising:
code for decreasing a PN offset separation in dilated chips between the small cell and another small cell compared to a PN offset separation for a normal bandwidth carrier based on the bandwidth scaling factor.

32. The computer program product of claim 28, wherein the non-transitory computer-readable medium further comprising:
   code for determining a portion of a bandwidth channel of a macrocell for the small cell to operate within utilizing the flexible bandwidth carrier; and
   code for transmitting information regarding the portion of the bandwidth channel for the small cell to operate within.

33. The computer program product of claim 28, wherein the non-transitory computer-readable medium further comprising:
   code for receiving information from another small cell regarding a portion of a channel in which the other small cell has determined to operate within utilizing another flexible bandwidth carrier; and
   code for determining another portion of the channel to operate within based on the received information utilizing the flexible bandwidth carrier.

34. A wireless communications device configured for implementing flexible bandwidth small cells, the device comprising:
   at least one processor configured to:
      determine a first bandwidth scaling factor for a small cell;
      generate a flexible bandwidth carrier for the small cell utilizing the first bandwidth scaling factor;
      receive a trigger to dynamically adjust the flexible bandwidth carrier;
      determine, in response to the trigger, a second bandwidth scaling factor for the small cell, wherein at least one of the first bandwidth scaling factor or the second bandwidth scaling factor is based on a number of users to be supported by the small cell or a traffic demand for one or more users of the small cell; and
      adapt the flexible bandwidth carrier for the small cell from utilizing the first bandwidth scaling factor to utilizing the second bandwidth scaling factor.

35. The wireless communications device of claim 34, wherein the at least one processor further configured to:
   change a channel number of the small cell when utilizing the flexible bandwidth carrier.

36. The wireless communications device of claim 34, wherein the at least one processor further configured to:
   generate a beacon-like state for the small cell utilizing the flexible bandwidth carrier through altering a transmit power of the small cell utilizing the flexible bandwidth carrier.

37. The wireless communications device of claim 34, wherein the at least one processor further configured to:
   decrease a PN offset separation in dilated chips between the small cell and another small cell compared to a PN offset separation for a normal bandwidth carrier based on the bandwidth scaling factor.

38. The wireless communications device of claim 34, wherein the at least one processor further configured to:
   determine a portion of a bandwidth channel of a macrocell for the small cell to operate within utilizing the flexible bandwidth carrier; and
   transmit information regarding the portion of the bandwidth channel for the small cell to operate within.

39. The wireless communications device of claim 34, wherein the at least one processor further configured to:
   receive information from another small cell regarding a portion of a channel in which the other small cell has determined to operate within utilizing another flexible bandwidth carrier; and
   determine another portion of the channel to operate within based on the received information utilizing the flexible bandwidth carrier.

40. The wireless communications device of claim 34, wherein the wireless communications device comprises a small cell access point.

* * * * *